Feb. 23, 1965 T. H. CHAMBERS ETAL 3,171,118

DELAY LINE STORAGE SYSTEM

Filed May 3, 1961 10 Sheets-Sheet 1

INVENTORS
TORRENCE H. CHAMBERS
LAWRENCE F. KALNOSKAS

BY Shelton McAnelly, Agt
Richard C. Reed
ATTORNEY

INVENTORS
TORRENCE H. CHAMBERS
LAWRENCE F. KALNOSKAS

BY Shelton McAnelly, Agt
Richard C. Reed ATTORNEY

INVENTORS
TORRENCE H. CHAMBERS
LAWRENCE F. KALNOSKAS

BY *Shelton McAnelly, Agt*
*Richard C. Reed* ATTORNEY

INVENTORS
TORRENCE H. CHAMBERS
LAWRENCE F. KALNOSKAS
BY Shelton McAnelly, Agt
Richard C Reed ATTORNEY INVENTORS
TORRENCE H. CHAMBERS
LAWRENCE F. KALNOSKAS
BY Shelton McAnelly, Agt
Richard C. Reed
ATTORNEY

INVENTORS
TORRENCE H. CHAMBERS
LAWRENCE F. KALNOSKAS

BY Shelton McAnelly, Agt
Richard C. Reed ATTORNEY

INVENTORS
TORRENCE H. CHAMBERS
LAWRENCE F. KALNOSKAS
BY Shelton McAnelly, Agt
Richard E. Reed ATTORNEY

INVENTORS
TORRENCE H. CHAMBERS
LAWRENCE F. KALNOSKAS

BY Shelton McAnelly, Agt
Richard Reed ATTORNEY

WAVEFORMS OF
TRIGGER GENERATOR 18(FIG.6)

WAVEFORMS OF SAMPLER
GATE PULSE GENERATOR 19 (FIG.7)

INVENTORS
TORRENCE H. CHAMBERS
LAWRENCE F. KALNOSKAS

BY Shelton McAnelly, Agt
Richard C. Reed ATTORNEY

FIG. 12
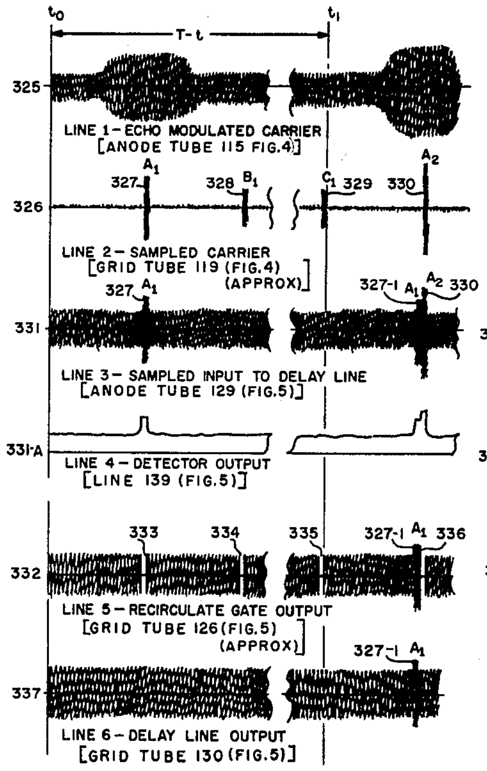
TYPICAL VOLTAGE WAVEFORMS
FIGS. 4 & 5
FIG. 13
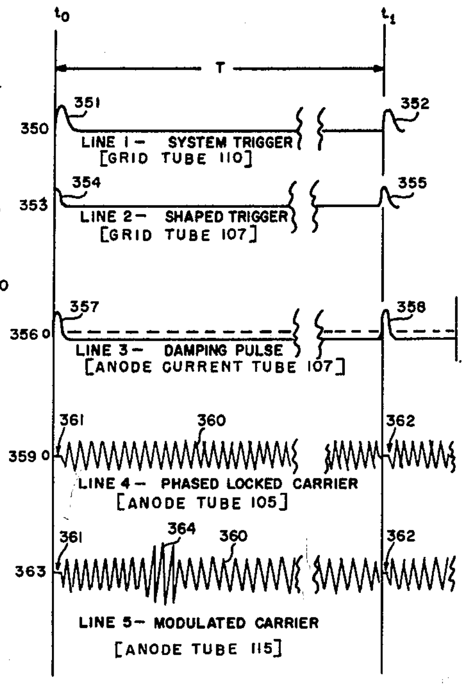
EXPLANATORY WAVEFORMS
OF FIG.4
[ALL VOLTAGE EXCEPT 356 WHICH IS CURRENT]
[359 & 363 TO EXPANDED CYCLE TO CYCLE SCALE]
INVENTORS
TORRENCE H. CHAMBERS
LAWRENCE F. KALNOSKAS
BY Shelton M. Anelly, Agt
Richard C. Reed ATTORNEY

United States Patent Office 3,171,118
Patented Feb. 23, 1965

3,171,118

DELAY LINE STORAGE SYSTEM

Torrence H. Chambers, Washington, D.C., and Lawrence F. Kalnoskas, Glassmanor, Md., assignors to the United States of America as represented by the Secretary of the Navy Filed May 3, 1961, Ser. No. 107,599
15 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

This invention relates to object detection systems in general and in particular to systems of the radar type in which storage of a plurality of received signals occurring at separate spaced intervals of time are stored and reproduced with a minimum of spacing in time to affect a reduction in the bandwidth of the received signals permitting the utilization of narrow band filter circuits to eliminate noise and provide improved analysis of the signals together with improved indication as to the velocity of objects. It is seen that the later portions of the foregoing statement refer to apparatus which is known to some extent as moving target indicator radar systems. As a further classification of the present invention, it relates to radar systems which are primarily of the "search" category in which it is desired to explore a large area as to energy reflective objects in a minimum of time. This "search" requirement introduces a very substantial complication into the overall picture of storage of received signals and correlated playback because of the fact that the system employed for such purposes requires a rotating antenna which will remain on any one target for only a short period of time during each revolution of the antenna. Highly effective storage systems have been available for some time, however, such systems normally are not of the so-called "search" radar classification but rather of a more accurate form of searchlighting radar in which the antenna itself is movable but does not normally sweep continuously in azimuth permitting substantially constant repetitive radar illumination of a selected target object or azimuth and hence signal storage and correlation over a long period of time.

An important consideration of a search radar system employing signal storage is that it be completely stable under such conditions as would be encountered in field service with more or less portable apparatus and a team of operators having a minimum of training. This again further complicates the overall situation because many systems which could be evolved would not be at all adaptable to mobility and the other difficulties encountered in mobile equipment such as variable voltages and frequencies of the supply power, vibration, temperature extremes, and the like.

All of the foregoing when coupled with the rapidly expanding technology involving the movement of vehicles at even greater velocities and accelerations places a very severe requirement on any system of the foregoing general type because such system must be capable of responding to objects having velocities at which prior art moving target indicator systems would be totally inoperative due to the fact that a null in the response curves of such prior art systems occurs in a region which is of considerable interest in present technology where vehicle velocities of the order of 800 miles per hour or higher must be provided for.

In apparatus of the foregoing type, a serious problem is the provision of a suitable signal storage device and system by means of which the radar pulses can be stored and reproduced at will for a sufficiently long period of time to obtain correlation over a sufficiently large quantity of pulses to justify any storage type of operation. Because of the stringent requirements for such storage, moving target indicator systems employed in the past do not even attempt to utilize long term storage and correlation principles but rather merely compare successive adjacent pulses to determine the nature of the motion of the targets but only from pulse to pulse. This provides then comparison over merely two successive pulses which is not at all an approach to storage and correlation technique.

It is accordingly an object of the present invention to provide an improved moving target indicator type of radar system.

Another object of the present invention is to provide a radar system having improved signal to noise enhancement characteristics.

Another object of the present invention is to provide a storage radar system in which signals occurring over a period of time and in time separation may be recorded and reproduced in such a way as to cause them to appear in close time relationship.

Another object of the present invention is to provide a method of employing correlation techniques in a scanning search radar.

Another object of the present invention is to provide an improved moving target indicator radar system in which signals responsive to a plurality of radar pulses typically of the order of 20 or more may be stored and employed for moving target indicator comparison purposes rather than the mere two adjacent signal comparisons which are employed in systems of the prior art.

Another object of the present invention is to provide a means for employing a quartz delay line as a storage medium in a correlation type radar system.

Another object of the present invention is to provide a quartz delay line storage radar system having extremely reliable and stable operation.

Another object of the present invention is to provide a correlation radar system without the use of complex magnetic or electrostatic storage mecahnisms.

Other objects and many of the attendant advantages of this invention will be readily appreciated as the same becomes better understood by reference to the following detailed description when considered in connection with the accompanying drawings wherein:

FIG. 1 of the present application shows a simplified block diagram of a typical embodiment of the features of the present invention, this figure being included primarily for facilitating the purposes of the broad description of the present invention.

FIGS. 2 and 3 together show a detailed block diagram of the apparatus of the present invention. These figures may be placed end to end to provide a complete overall block diagram.

FIG. 4 shows a schematic diagram of a typical embodiment of part of the present invention namely the sampler carrier generator 13. In addition to the components of the sampler carrier generator 13, the showing of FIG. 4 contains a part of the storage loop 14 of FIG. 2 to distribute the contents of the various sheets of the drawings in a more uniform manner.

FIG. 5 of the drawings shows in a schematic representation typical details of part of the apparatus of the storage loop 14 of FIG. 2 minus the I.F. sample gate 30 which as noted above is included in FIG. 4.

FIG. 6 is a schematic presentation of a typical embodiment of the trigger generator 18 of FIG. 2.

FIG. 7 of the drawings shows in schematic form typical details of the sampler gate pulse generator 19 of FIG. 2.

FIG. 8 of the drawings shows in typical schematic form the components of the Doppler filter system 15, peak selector 16, impedance matching device 17 of FIG. 1.

FIG. 9 shows a line representation of signals existent in the output of a coherent radar system for a plurality of successive sweeps operative with several types of targets.

FIG. 10 of the drawings shows typical signal waveforms existant in the trigger generator 18 of FIGS. 2 and 6.

FIG. 12 shows waveforms typical of the operation of the storage loop of FIGS. 2 and 5.

FIG. 13 shows waveform typical of the operation of a sampler carrier generator 13 of FIGS 2 and 4.

Figure 1:
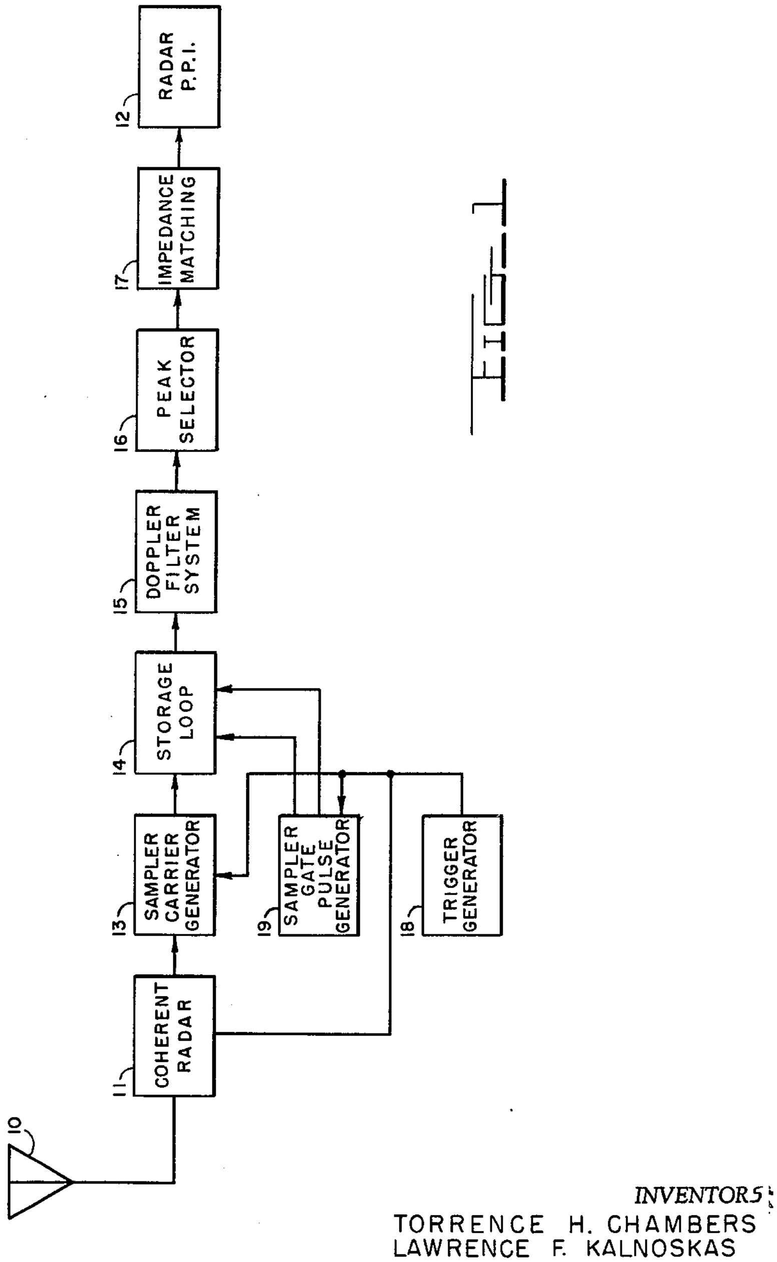

In any radar system the finite duration of the radar pulse employed inherently divides the total range available into a plurality of range elements, each of the range elements having a range increment proportional to the speed of propagation of electromagnetic waves and hence the distance through which such waves travel during the time of the individual pulse. It thus becomes impossible for a radar system to distinguish between individual targets on a range basis wherein the individual targets are located closer together in range than the inherent pulse gate distance. The term "inherent pulse gate distance" is sometimes referred to as the range resolution of a radar set. Accepting thus the inherent gating nature of a radar system, it then follows that a sample can be taken of the signal received by the radar system, such sample being substantially shorter in duration than the radar pulse, and yet this shorter duration sample will still contain, although at increased bandwidth, the information as to a distant target located within that range gate without wasting time in other nonsampled portions of the range gate. Such sampling does not in itself provide any improvement over a conventional system. If now the samples taken during a selected range gate in response to a plurality of sequential radar pulses were stored in time sequence, so that the product of the number of pulses stored and the duration of the sampling period were equal to the duration of the radar pulse and were then reproduced, filtered and detected, then the situation would be returned to the bandwidth condition in which comparatively narrow band amplifier circuitry would be adequate to handle the resulting longer duration signal. This provides an enhancement of the signal-to-noise ratio and a very substantial gain will be experienced where it is desired that the radar have moving target indicator characteristics because then it will be able to compare and analyze the return signals over a longer period rather than comparing on a pulse to pulse basis as is now done in conventional prior art moving target indicator systems.

With the concepts of the foregoing paragraphs as a basis for the apparatus and techniques of the present invention it then becomes a matter of obtaining a storage medium which will retain the sampled radar information together with suitable auxiliary apparatus which will perform the sampling and the application and derivation of signals relative to the storage medium in such a manner as to obtain the desired improvement in the MTI operation of a radar system. The selection of a suitable storage means or medium is not an easy task because of the fact that it must be capable of storing signals which inherently are of a wide band characteristic due to their pulsed nature and must receive and retain those signals in precise time relationship and phasing relationship despite repeated playback and reinsertion. Electrical signal delay lines which are built upon the ultra sonic principle have a storage property in that signals delivered at one end of such a delay line are propagated through the delay line with a finite delay in propagation depending upon the effective "length" of the line and its propagational velocity characteristics. It follows then that a line could be employed having an electrical length at least equal to the spacing between radar pulses with which signals could be stored from one radar pulse to the next for comparison purposes. There are prior art systems embodying such general techniques, however, these systems were able to store over only a very few radar repetition periods and hence were not true correlator systems able to attain optimum characteristics in the radar.

To avoid such prior limitations and to make it possible to employ correlation for MTI service has been one of the basic purposes of the present invention. Since bandwidth of the delay medium is of primary importance because it provides a limitation on the bandwidth of the sample and hence upon the number of samples that can be handled in a selected period of time, it is desirable to have a delay device with the widest possible bandwidth consistent with the duration of the storage time, during which samples must be retained within the system. To store signals for a typical 20 successive radar pulses requires that signals once introduced into the system be retained for a period of time equal to the product of the radar repetition period which may typically be 1251 microseconds times the number of samples involved. Such storage would require the capability for storing signals for 25,000 microseconds which is at least at the present state of delay line techniques impossible. It is of course to be pointed out that such signal storage by recording techniques employing magnetic or electrostatic storage devices are known in the art, however, these devices are of a very complex mechanical nature requiring precision high speed moving parts, air bearings, etc., or very carefully controlled electrostatic storage tube techniques. Therefore it is an object, as previously stated, of the present invention to avoid such electromagnetic or electrostatic storage devices.

Again attention for a solution of the problem turns toward the delay line. Such lines are presently available having long delays of the order of 3300 microseconds and bandwidths of 20 to 30 megacycles. A scheme employing such delay lines has been evolved based upon a novel sampling pulse technique wherein the delay line need have an electrical length of approximately the radar pulse repetition period, typically the 1251 microseconds previously mentioned or more exactly for reasons which will be seen later, an offset of one sampling pulse duration, to 1251 microseconds. This technique involves the repeated reintroduction of the output samples into the delay line and the placement of the samples in precisely controlled time relationship in their delivery to the delay line so that the samples for a typical 20 successive radar pulses of 20 microseconds duration each are stored as 20 samples of 1 microsecond duration in adjacent time relationship in the delay line up to a total of 20 sample pulses for a time period equivalent to the original 20 microseconds duration of the radar pulse. This scheme, although it does place extremely high bandwidth requirements on the overall system because of the repeated application thereto (in this case 20 times) of the pulses making it essential to have circuits of extremely high fidelity and wide bandwidth, does effectively provide a means for retaining in a single delay line of reasonable size samples of all range elements over a 20 pulse operation of the radar system.

When the 20 samples of a range gate are delivered from the delay line they emerge with practically no separation between so that in effect they merge into a single long pulse of 20 microseconds duration having MTI information extending over 20 radar pulses which is delivered and used as the signal pulse in the balance of the apparatus.

Thus far in evolving the broad discussion of the principles of the present invention, great emphasis has been laid upon bandwidth of the circuit. This is an extremely important consideration because for the typical system such as that having constants previously set forth, the continual reinsertion of signals into the delay line requires in effect a feedback system in which the delay line output is amplified sufficiently and then applied in turn to the delay line input. This feedback may be looked upon as approaching a positive feedback condition which would seem to indicate a danger of instability. Actually this danger does exist but by precise arrangement of the feedback loop it is possible to avoid such dangers. Provisions for such stability maintenance then are also required in any system employing the multi-pass delay line technique for MTI improvement. Thus the delay line feedback loop requires provision for wiping out the recirculation of pulses at carefully controlled intervals to permit the introduction of new information and also performs this wiping out and introduction of information in such a way as to avoid the retention of old information in the period in which new information is supplied. In this manner, together with carefully avoiding any overlap in the samples themselves as delivered to the delay line for reintroduction therein, a completely stable system of small size and comparatively light weight is provided which is suitable for use in adverse conditions of temperature, humidity, vibration, etc., such as is usually encountered in a mobile radar installation.

Figure 2:
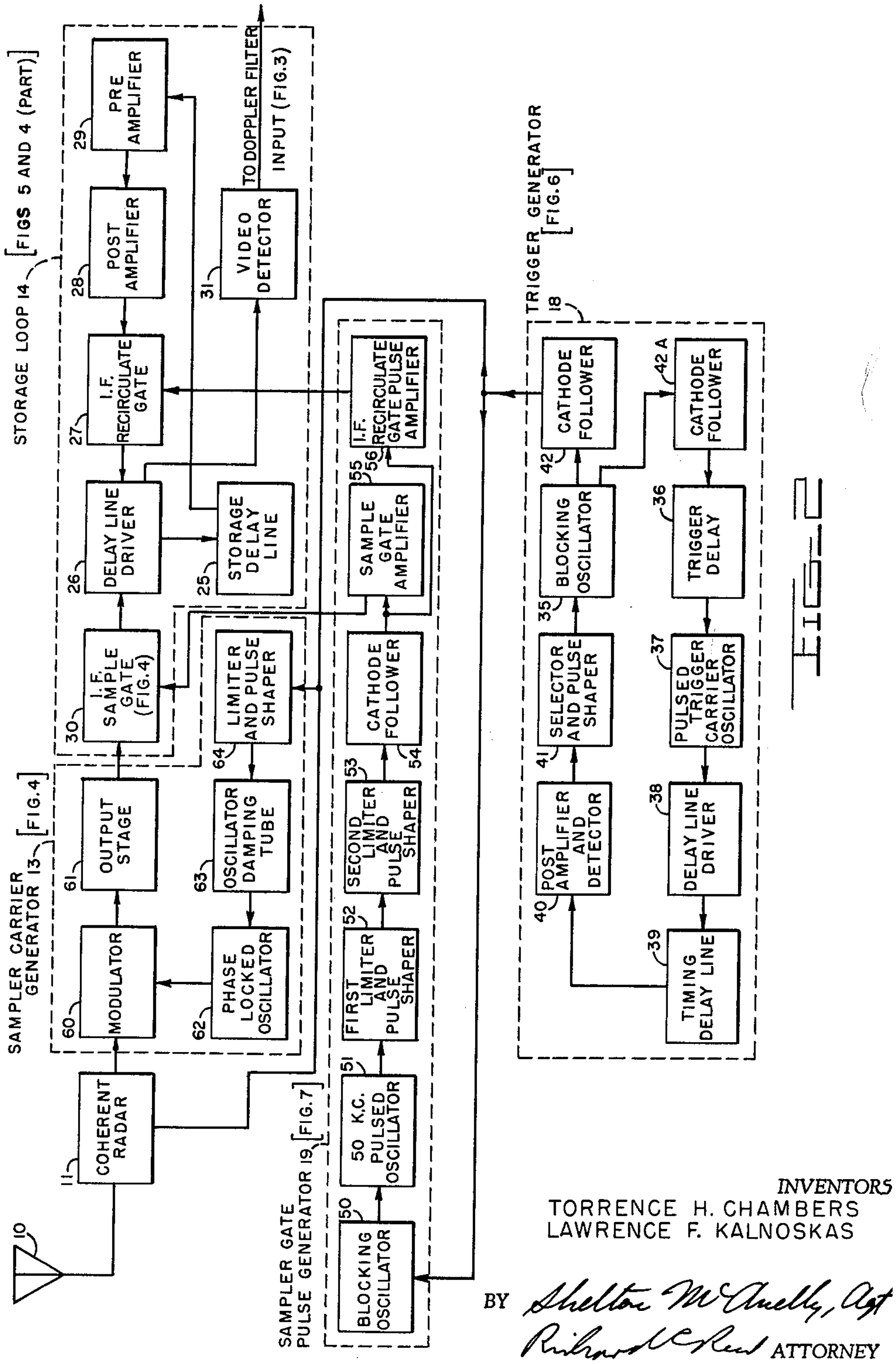
Figure 3:
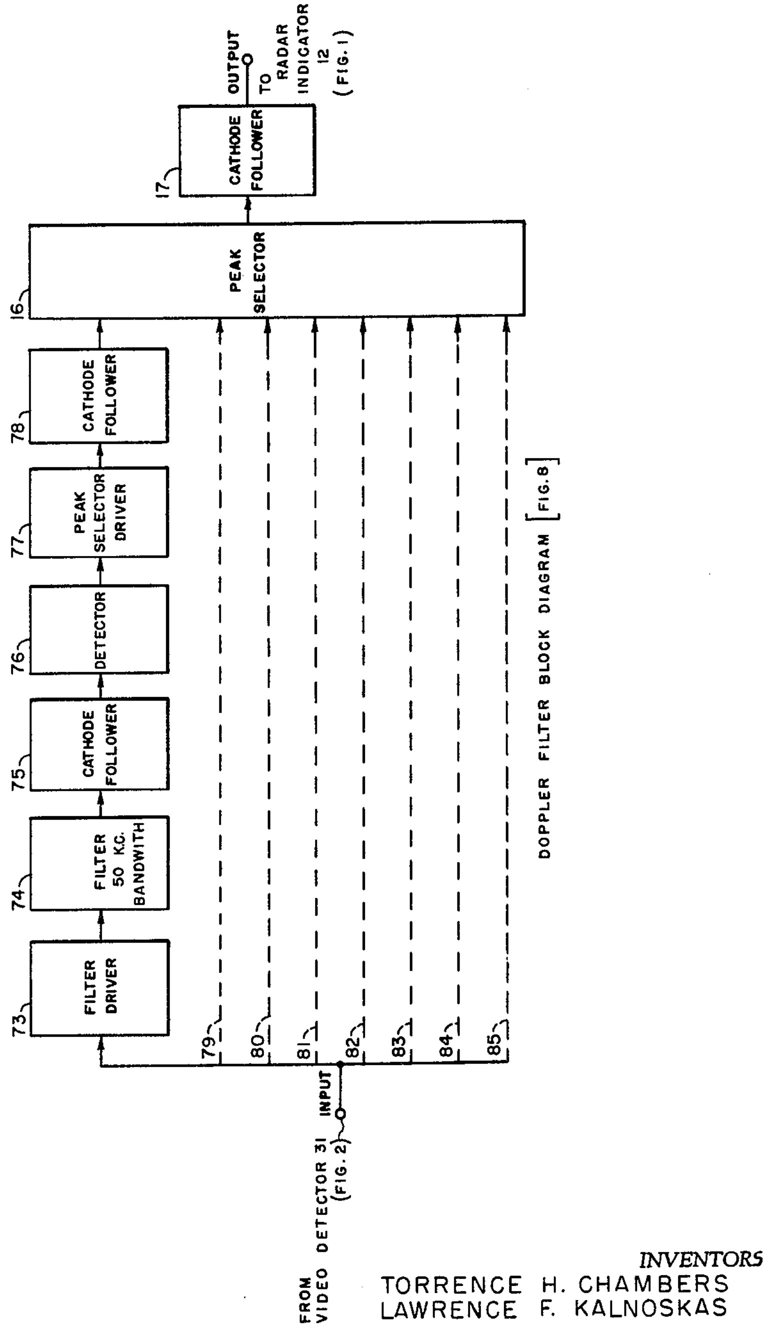

In view of the complexity of the apparatus, it is believed desirable to set forth further broad details in connection with a specific showing such as that of FIG. 1 to which attention is now directed, it being understood that FIG. 1 is to some extent repetitious when viewed in connection with the more detailed showings also in block form in FIGS. 2 and 3, however, FIG. 1 is included at this point for the purpose of facilitating a broad description of the invention.

A block diagram of a typical complete storage search radar system embodying the principles of the present invention is shown in FIG. 1. FIG. 1 is shown to form a basis for the introduction of the description of the apparatus and for emphasizing the components of FIGS. 2 and 3 and their relationships. The apparatus of FIG. 1 includes 3 elements which are basic to radar systems, namely an antenna 10, coherent radar 11 and an indicator 12 which is typically a P.P.I. radar indicator. To these basic components is added a plurality of components which constitute the basic advancement provided by the present invention. The basic radar elements 10, 11 and 12 are more or less conventional in nature, the antenna 10 typically having a beamwidth characteristic of 10° and rotated in azimuth at a rate of 5 revolutions per minute. The coherent radar 11 generates pulses of phase controlled radio frequency energy having the desired duration and time spacing consistent with the resolution between targets desired and the maximum range desired for targets. One requirement of this radar system as far as its relationship to the so-called additional apparatus of the present invention is that it be a radar of the coherent type in which a specific relationship in the phasing of the R.F. carrier for successive pulses is maintained. Coherent radar systems are well known and profusely described in the public literature, such as U.S. Patent No. 2,535,274 issued to Robert H. Dicke on December 26, 1950. The radar system 11 which includes suitable low level receiver amplifier, mixer, intermediate frequency, and detector stages supplies an output video pulse which in a normal radar system would be delivered to the indicator 12 which provides an azimuthal sweeping form of presentation in which targets are indicated in proportion to their azimuth from the location of the radar antenna 10 and their range relative thereto. Such a radar P.P.I. indication is of course well known in the present state of the art.

In the apparatus of the present invention a plurality of additional components are inserted between the coherent radar 11 and the radar P.P.I. indicator 12. These components are a sampler carrier generator 13 by means of which the video pulses are converted to a suitable carrier wave of desired frequency characteristics for the delay line, and a storage loop 14 which contains the delay line mentioned in the introduction together with suitable amplifier circuits, the delay line connected in series with the amplifier circuits whereby the output from the delay line is amplified and then applied again to the input of the delay line by means of which signals once introduced into the delay line are caused to repeatedly traverse the delay line until by suitably timed gating signals they are removed from the storage loop. Thus the signals in carrier form in the output of the sampler carrier generator 13 are delivered to the signal delay line of the system in the component 14 and under control of special timing pulses are reproduced and delivered to the Doppler filter system 15. The Doppler filter system 15 contains a plurality of parallel filters which receive the output from the storage loop and separate this into various lines or notches in dependency on frequency. The Doppler filter system 15 is connected to peak selector 16 which determines the signal from the various filters which is of maximum amplitude at any one instant and delivers that signal through suitable impedance matching 17 to the indicator 12. To control the operation of the storage loop as well as introduce a very precise control into the phasing of the sample carrier signal, two additional components are provided in the apparatus of FIG. 1. A trigger generator 18 provides pulses which gate the delivery of signals to and from the storage loop 14. This trigger generator 18 controls the delivery of the signals to and from the storage loop amplifier through the intermediate action of a sampler gate pulse generator 19 which develops gating pulses having specifically desired characteristics for the operation of the storage loop in response to trigger signals obtained from the trigger generator 18. In addition the trigger generator 18 is connected directly to the sampler carrier generator 13 by means of which the carrier produced by component 13 is caused to have certain desired characteristics which will be substantially explained in greater detail. In operation of the apparatus of FIG. 1, a storage loop is employed in which the period thereof is typically 1250 microseconds. Typically under these conditions a radar pulse period of 1251 microseconds would be employed. All of this would correlate with a sample number $n$ equals to 20, a sample spacing or sample width $t=1$ microsecond and a range element or radar pulse of $\tau=$approximately 20 microseconds. Under these conditions the storage loop typically would have an open loop bandwidth of the order of 15 megacycles.

With reference now to FIG. 2 of the drawings, greater details of the apparatus are indicated in a second block diagram wherein the storage delay line is indicated by the reference character 25 located within the storage loop 14. In addition to storage delay line 25, the storage loop contains the I.F. recirculate gate 27, post amplifier 28, and preamplifier 29. Within this loop signals are applied to the storage delay line 25 with suitable impedance characteristics by the delay line driver 26. Typically these signals initially are obtained from the I.F. sample gate 30. After the signals initially applied to the storage delay line 25 have traversed that delay line they emerge and are applied to the preamplifier 29 which is followed by the post amplifier 28. Signals from the post amplifier 28 are further amplified in the I.F. recirculate gate 27 at which time a precisely selected portion of the signals is applied to the delay line driver 26 for reinsertion into the storage delay line 25. It is this overall loop which has the characterized storage loop period $T_s$ of 1250 microseconds in a typical case, and which is gated as to the introduction of new signals thereto and the selection of older signals for reintroduction by the I.F. sample gate 30 and I.F. recirculate gate 27, respectively, the I.F. recirculate gate 27 blocks the storage loop momentarily at the period of introduction of each new signal. In this way the storage loop is caused to recirculate and erase itself in such a way that each signal traverses the loop the desired 20 times and is then removed.

Precise operation of the gates 27 and 30 is provided by the sampler gate pulse generator 19 under control of the trigger generator 18 as previously mentioned. To this end trigger generator 18 contains a blocking oscillator 35. Blocking oscillator 35 is part of a closed trigger timing loop containing in addition a cathode follower 42–A, a trigger delay 36, a pulsed trigger carrier oscillator 37, a delay line driver 38, a timing delay line 39, a post amplifier and detector 40, and a selector and pulse shaper 41. For the sake of conversion, a separate delay line may be used for the timing although it is frequently desirable to use the main delay line for the timing as well as the signal storage function as in conventional M.T.I. systems. As in the storage loop, a timing pulse circulates within the timing loop with an internal period determined by the delay time of the delay line and additional small delays inherent or deliberately inserted in the intermediate frequency and video circuits of the trigger generator. The blocking oscillator 35 is locked to a period equal to the trigger loop delay time. The output of the blocking oscillator when applied to the trigger delay 36 through cathode follower 42–A is delayed in its traversal of the loop to provide a fine control of the trigger loop period. Thus the trigger delay circuit provides an output pulse which is delayed a selected amount relative to an output pulse from the blocking oscillator 35.

The output pulse from the trigger delay 36 controls the operation of the pulsed trigger carrier oscillator 37 in such a manner that during the occurrence of the pulse from the trigger delay 36 the pulsed carrier oscillator is energized in some suitable manner such as the removal of a heavy damping current across the tank circuit of the oscillator to produce the carrier frequency signal of desired frequency for the operation of the timing delay line. This carrier frequency pulse is amplified in the delay line driver 38, delayed by the timing delay line 39, further amplified by the post amplifier 40 to compensate for delay line attenuation and detected to provide a video pulse to the amplitude selector and shaper 41 which is employed to trigger the blocking oscillator 35 for its pulsed operation to continue the loop signal period. Output signal from the loop to control the additional circuitry is provided in a low impedance manner by a cathode follower 42 connected to the blocking oscillator 35.

The gating of the signals for the storage loop 14 by the I.F. sample gate 30 and the I.F. recirculate gate 27 is effected by the sampler I.F. gate pulse generator 19. This pulse generator contains a blocking oscillator 50 which is connected to a 50 kilocycle per second pulsed oscillator 51 the output of which goes to a first limiter and pulse shaper 52 which is followed by a second limiter and pulse shaper 53. The second limiter 53 is connected to cathode follower 54. The cathode follower is connected both to the sample gate amplifier 55 which is in turn connected to I.F. sample gate 30 and to I.F. recirculate gate pulse amplifier 56 which is in turn connected to I.F. recirculate gate 27.

In operation of the sampler I.F. gate pulse generator 19, the connection of the blocking oscillator 50 to the cathode follower 42 output of the trigger generator 18 causes the blocking oscillator 50 to be triggered to generate a pulse of 10 microseconds duration and having sufficient amplitude to damp the 50 kilocycle per second pulsed oscillator 51 for the duration of the 10 microseconds blocking oscillator pulse. At the end of this 10 microseconds pulse the oscillator 51 resumes its operation beginning always with a selected phase of operation, the oscillation continuing until the occurrence of a succedent pulse from the blocking oscillator 50 which again damps the oscillator 51 and causes it to cease operation for a 10 microseconds period. The first limiter and pulse shaper 52 is in effect a square wave generator which typically is a Schmitt circuit providing zero crossing amplitude selection of the sine wave and also limiting action thereof to produce a square wave having a 20 microseconds period. The square wave from the first limiter and pulse shaper 52 is differentiated and applied to a second Schmitt circuit within the second limiter and pulse shaper 53 which produces a train of narrow pulses of from ¼ to 2 microseconds selectable duration and spaced at the 20 microseconds recurrence period. The duration of these pulses is what controls the duration of the time at which radar signals are delivered to the storage loop. The pulse output of the second limiter and pulse shaper 53 typically is a positive polarity pulse which is inverted in the sample gate amplifier 55 and I.F. recirculate gate pulse generator 56 to produce negative pulses having typically one microsecond duration and an intervening space of 19 microseconds.

At this point then the problem is that of employing this negative pulse of the typical 1 microsecond duration in such a way as to cause the introduction of new signals to the delay loop during this period which must be accomplished by a blocking of the loop signal during this period to make room for the introduction of the new signals. The signal provided at low impedance by the sample gate amplifier 55 is applied to the cathodes of gating tubes in the I.F. sample gate 30 and during the positive portion holds the I.F. sample gating tube cathode at a high potential so that the tubes are cut off blocking the passage therethrough of new signals. During the one microsecond negative pulse period the I.F. sample gate 30 operates as a normal intermediate frequency amplifier passing a narrow one microsecond duration sample of the carrier frequency.

To control the gating within the storage loop, pulses of negative polarity and the typical 1 microsecond duration are taken from the I.F. recirculate gate pulse amplifier 56 and applied to grids of tubes in the I.F. recriculate gate 27, the result being that this particular gate is operative for a 19 microseconds period but blocked during the typical 1 microsecond period.

The sampler carrier generator 13 contains a modulator 60 by means of which the video frequency output from the coherent radar 11 is converted into a carrier frequency signal of a frequency desirable for the operation of the storage loop. To this end the modulator 60 is connected to the coherent radar system 11 and to an output stage 61 as well as to a phase locked oscillator 62. The phase locked oscillator 62 provides the carrier frequency signal desired for the operation of the storage loop. It is understood that phase locking is not essential in the generation of this carrier frequency. It does however reduce bandwidth requirements and hence may be desirable. Operation of the phase locked oscillator 62 is controlled by a connection to the oscillator damping tube 63 which in turn is controlled by a connection to the limiter and pulse shaper 64 which is fed from the trigger output from cathode follower 42 of trigger generator 18. In operation the phase locked oscillator 62 may typically provide a 30 megacycle carrier frequency centered within the bandpass of the storage loop which is amplitude modulated by radar return echoes in the modulator 60 and fed to the I.F. sample gate 30 through the output stage 61. Phase locking of the oscillator 62 is employed to improve storage characteristics by reducing random modulation due to overlapping samples within a range element. In operation the starting phase of the phase locked oscillator is locked to the system trigger in a manner similar to that of the 50 kc. pulsed oscillator 51 previously described.

All samples within the range element then have the same starting phase so that by varying the spacing between samples or by a slight retuning of the carrier oscillator the overlapping regions of adjacent samples can be placed in phase opposition at the carrier frequency to reduce modulation in the overlap region.

The limiter and pulse shaper 64 operates in response to the basic system trigger pulse to produce a shorter pulse typically half the duration of the system trigger pulse and it is this short pulse which controls the oscillator damping tube at the end of which phase locked oscillator 62 begins the production of the typically desired 30 megacycles per second carrier signal for modulator 60.

With reference now to FIG. 3 of the drawing, the apparatus shown therein contains details of the Doppler filter system 15 of FIG. 1 indicating also the connections of the filter bank to the peak selector 16, the impedance matching cathode follower device 17 and the radar indicator 12 as well as the feed connection system from the video detector 31 of FIG. 2. The filter system contains a plurality of separate bandpass filter paths connected in parallel each receiving the video detector output and supplying an independent output as to the components of the video detector output falling within its frequency band. In the typified instance the Doppler filter bank contains 8 filter paths each having a different 50 kilocycle bandwidth in the 100 to 500 kilocycle range. Frequencies below 100 kilocycles in this instance are excluded because they relate to slow moving targets or ground return occurring in the region of zero to 50 kilocycles. The 50 to 100 kilocycle region filter is omitted because this region contains radar returns from slowly moving clutter such as windblown tree branches or sea waves.

Thus each of the 8 filters contains as typified for one filter, a driver 73 which provides the desired impedance matching and freedom from loading of the video detector 31, the filter driver 73 being connected to the filter 74 which is indicated as having a typical 50 kilocycle bandwidth. The output of the filter is applied to an impedance conversion device or cathode follower 75 which is connected to a detector 76 by means of which the video signals are detected. Detector 76 is connected to peak selector driver 77 and cathode follower 78, the two being primarily impedance coupling devices. Each of the additional filter paths identified by the reference characters 79, 80, 81, 82, 83, 84 and 85 is tuned to a different 50 kc. band of the 100 to 500 kilocycles to provide its separate output as indicated previously.

All of the parallel filter paths are connected to the peak selector 16 which as previously indicated is in turn connected through impedance matching device 17 to the radar PPI indicator 12. Also as previously mentioned the peak selector selects the one of the filter outputs having the largest amplitude at any one instant for application to the radar indicator 12.

The Doppler filter takes the signal from the storage system, extracts the Doppler information, and transforms it into a single video signal which can be presented on the PPI. The signal from detector 31 of the storage system is a burst of multiplied Doppler frequency, one range element (20 microseconds) in length. The level of this signal at the input is relatively low and it is therefore amplified in the filter driver 73 before filtering. Such location of individual amplifier stages 73 for the various paths isolates the individual filters of the filter bank from each other. Typically the filters are of the double tuned, equal Q transformer type. They have very good selectivity and the skirts of the passband are very sharp. The parameters chosen to be used in this system set the optimum bandwidth for each filter at 50 kilocycles, for maximum velocity resolution.

When a signal appears at the filters it is normally passed by one filter or perhaps two filters if it occurs in a region of a crossover between filters and is rejected by the other filters. Since the pulse spectrum is basically 50 kilocycles wide, the only time the signal will be passed completely by one filter and totally rejected by all the others is when the frequency is centered in a passband. At any other time there will be energy in a pair of adjacent filters. Should the signal be of such frequency that it falls at the crossover point, between two filters, each filter will contribute equally to the output. Measurement of individual channel output can be made to indicate target radial velocity.

Following the individual filters 74, the detectors 76 rectify the Doppler frequency signal and deliver a single video output. The time constant of the detector filters is short enough to allow the output pulse to build up in less than ¼ of a range element. Normally the decay time of the detector filters will be longer than the rise time but nevertheless it should be kept as short as possible.

The rectified output of the detectors 76 is amplified by the video amplifier stages 77 and cathode followers 78 in order to obtain enough amplitude to operate the peak selecting circuit 16. In practice each of the peak selector driver video amplifiers 77 is adjusted as by variation of plate loads to insure that the gains of all 8 filter channels are equal.

Figure 4:
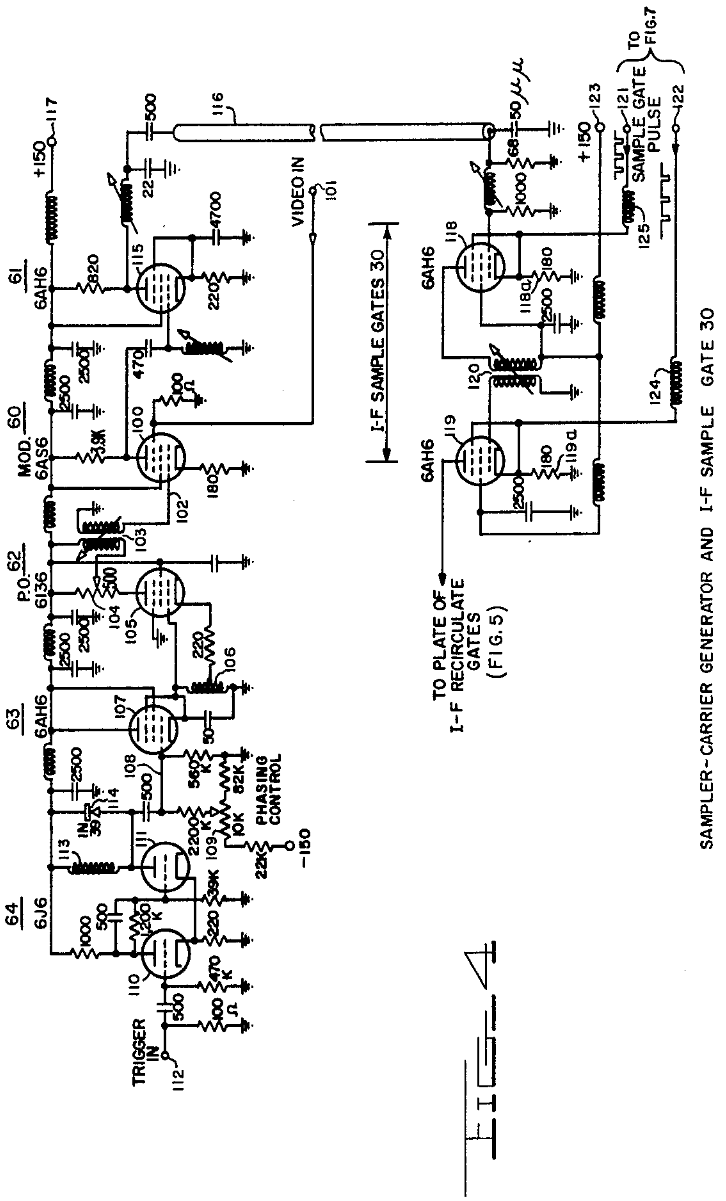

With reference now to FIG. 4 the showing therein is a schematic presentation of typical apparatus of the sampler carrier generator 13 of FIG. 2 and the I.F. sample gate 30 also of that figure but forming a part of the overall block labeled therein storage loop 14. The circuit of tube 100 corresponds to the modulator 60, FIG. 2, as indicated by the line drawn under reference character 60 in FIG. 4, with the input video from the coherent radar 11 of FIG. 2 being applied at terminal 101 from which it is delivered to the suppressor grid of tube 100 which as indicated is of the pentode type more specifically in a typical instance a type 6AS6 electron tube. The carrier signal upon which the video modulation is impressed by the modulator tube 100 is applied to the control grid 102 of tube 100 by means of a suitable coupling arrangement indicated in general as a transformer 103 and potentiometer 104 in the anode circuit of tube 105 which corresponds to the principal component of the phase locked oscillator 62 of FIG. 2. As shown this oscillator employs a type 6136 tube in its typical configuration being connected in the form of a Hartley type oscillator employing a tank circuit including the tapped inductance 106.

Connected across the tank circuit is a damping tube 107 corresponding to the principal component of the oscillator damping tube 63 of FIG. 2, the connection being made in a cathode follower form of arrangement whereby the tube 107 can provide a very low impedance shunt of the tank circuit of inductance 106 to maintain the Q of that circuit sufficiently low so as to prevent oscillation therein and at the same time insure that the initial positive swing of voltage across the inductance 106 is always identical following an instant in time at which tube 107 is rendered nonconductive by a signal applied to the grid 108 thereof.

Tube 107 is normally maintained nonconductive by virtue of a negative potential applied to its grid 108 through the variable biasing resistance network 109 labeled phasing control. In general it provides for the maintenance of tube 107 in a cut-off condition except for a brief recurrent instant during which a pulse is obtained from the Schmitt trigger circuit of tubes 110 and 111 which itself is triggered by the system trigger pulse applied to an input terminal 112 for delivery to the control grid of tube 110. The trigger circuit of tubes 110 and 111 corresponds to the component 64 of FIG. 2 and normally rests in a condition wherein tube 111 is conductive and tube 110 is cut off by virtue of the return of the control grid of tube 110 to ground potential and the connection of the grid of tube 111 to a voltage divider connected between the anode of tube 110 and ground.

The anode of tube 111 is connected to the supply potential through an inductance 113.

In the normal state of the Schmitt trigger circuit the conductive condition of tube 111 causes the flow of a substantial amount of current through inductance 113. When the normal status of the one-shot multivibrator is interrupted as by the application of a positive trigger pulse to the grid of tube 110, tube 111 is momentarily cut off resulting in the production of a sharply rising pulse potential at the anode of tube 111 due to the inertial effect of the current flow in the inductance 113. The maximum amplitude of this positive swing at the anode of tube 111 is limited to a selected amount by the damping unilateral impedance device 114 connected thereacross. At the end of the brief conductive period of tube 110 tube 111 returns to conduction to produce a heavy current flow through inductance 113 and damping thereof to prevent the continuance of a damped oscillatory wave train thereacross.

Thus by careful proportioning of the resonant frequency of the inductance 113 it is possible to apply to the damping tube 107 a positive pulse of precisely controlled amplitude and duration which because of the low output impedance of the cathode follower connection of tube 107 effectively provides a complete damping of any oscillations of the phase locked oscillator tube 105. At the termination of the pulse applied to the grid 108 the phase locked oscillator tube 105 immediately resumes oscillation always with a precise phasing relative to the system trigger so that the desired condition for improving the storage characteristics of the storage loop of the circuit is maintained.

The biasing resistance network 109 is inserted to vary the level of the pulse produced across inductance 113 at which the tube 107 is raised above cut-off and hence provides a slight variation in the instant of time at which tube 107 is cut off near the end of each pulse.

The modulator tube 100 is connected to an I.F. output amplifier employing tube 115 corresponding generally as the principal component of the output stage 61 of FIG. 2. In this stage a high transconductance tube, typically of a 6AH6 type, is employed to provide amplification at low output impedance suitable for driving a short section of 50 ohm coaxial cable indicated by reference character 116 which is desirable if the balance of the apparatus of FIG. 4 is placed on a separate chassis. The intermediate frequency amplifier of tube 115 has more or less conventional loading, biasing and drive circuitry with tuning provision being made for the grid and anode thereof to obtain optimum operation at the desired frequency which in this typical instance has been indicated to be approximately 30 megacycles center frequency.

The string of tubes 110, 111, 107, 105, 100 and 115 is provided with suitable supply decoupling and isolation circuitry for the connection if desired to a single B+ supply at the terminal 117 together with suitable ground and heater connections.

It should be emphasized that with this specific schematic as with all schematics to follow typical circuit values which were included in a specific complete apparatus of the overall invention are included to indicate in general the various bandwidth and frequency relationships present in the overall circuit and otherwise assist in an understanding of the circuitry.

FIG. 4 contains in addition to the components previously described for the sampler carrier generator 13, the components of he I.F. sample gate 30 of the storage loop 14. The principal components of this I.F. sample gate are the tubes 118 and 119 which are typified as of the type 6AH6 having high transconductance characteristics, the control grid of tube 118 being driven from the coaxial cable 116 which is at that point provided with suitable termination and impedance control apparatus indicated by the components connected between the end of the coaxial line and the control grid of tube 118. Tubes 118 and 119 of this two stage amplifier are coupled by transformer 120 and both are simultaneously gated by separate identical signals applied to their cathodes from terminals 121 and 122, these signals being of negative pulse polarity having the precisely controlled duration of approximately 1 microsecond with a "positive" portion of approximately 19 microseconds duration intervening between the negative pulses. These negative going pulses applied to terminals 121 and 122 are obtained from the sampler gate pulse generator 19 of FIG. 2 which is also shown in greater detail in FIG. 7. It might appear that the gating scheme of the I.F. sample gate is complex in that it is applied to two tubes of a two stage amplifier and that it would have been adequate to have applied the gating pulse to one tube alone, however, it has been found that improved operation and maintenance of the desired extremely sharp gating is obtained by simultaneously gating both tubes of the two stage amplifier.

The sample gate of tubes 118 and 199 is provided with suitable conventional biasing and supply potentials and components for a two stage amplifier together with appropriate filtering and decoupling, the anode potential being obtained from a single 150 volt supply terminal 123 which may or may not be identical to that of 117 as desired and convenient. In some instances it might be desirable for example to employ separately derived and filtered potentials 117 and 123, however, with a well designed low impedance source it is of course possible to employ a single source of potential for terminals 117 and 123. A pair of components which should be emphasized is the inductances 124 and 125 which are placed respectively between the connections of the suppressor and cathode of tube 119 and terminal 122 and the suppressor and cathode of tube 118 and terminal 121. These inductances provide decoupling so that the carrier frequency signal impressed on the gating circuits by the plate to suppressor grid capacitance of tubes 118 and 119 will not be delivered to terminals 121 and 122 and thereby be coupled into other circuits where its presence is undesirable.

In the block diagram of FIG. 2 the I.F. sample gate 30 is shown connected to the delay line driver 26. This connection is accomplished in the schematic diagrams of FIGS. 4 and 5 by the connection of the anode of the previously described tube 119 to the anode of tube 126 of FIG. 5 to which attention is now directed. This connection effectivley places both tube anodes in parallel and connected to an interstage coupling transformer 127 whereby amplified signals from each tube are delivered to the grid of tube 128.

Figure 5:
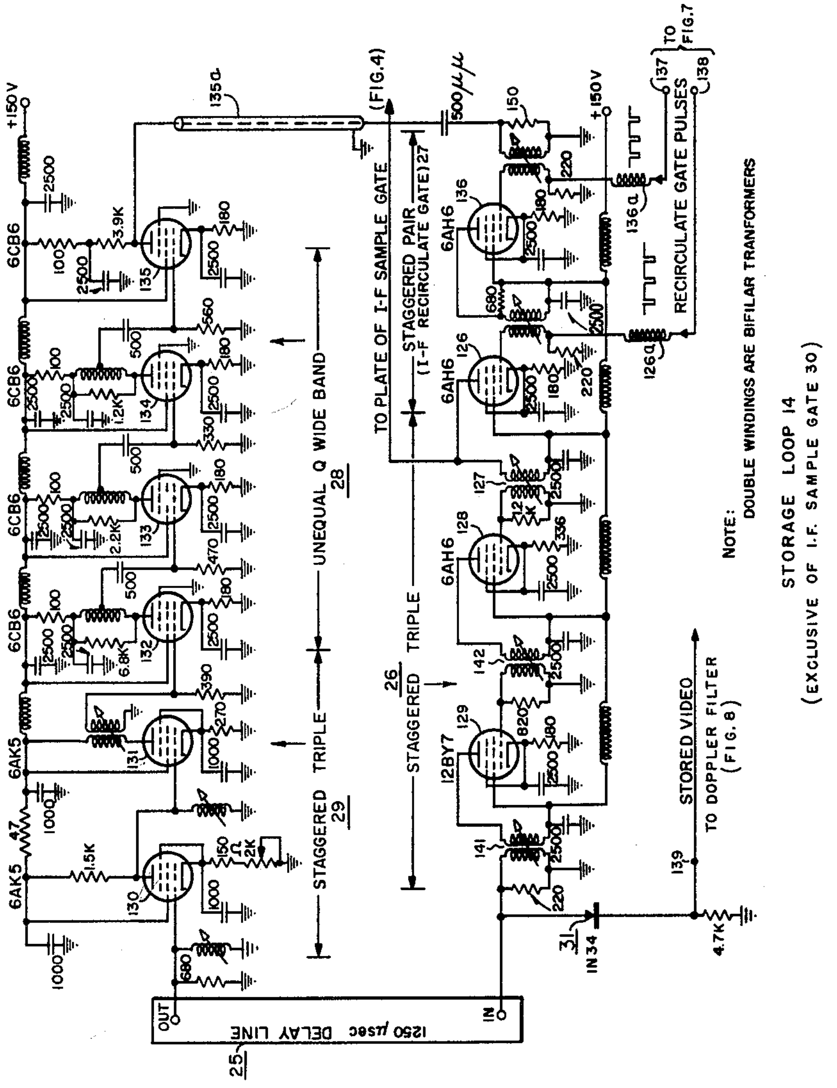

By this arrangement the gated modulated signal having signal video impressed thereon is applied to the storage loop. In addition to the tubes 126 and 128 and their associated circuitry the storage loop is as shown in FIG. 5 a continuous recirculating arrangement which contains the tube 129 coupled to tube 128, the storage delay line 25 coupled to the anode of tube 129, the tubes 130, 131, 132, 133, 134 and 135 connected in sequence as a six-stage amplifier of high gain and wide bandwidth corresponding to the principal components of the preamplifier 29 and post amplifier 28 of FIG. 2. In addition the anode of tube 135 is connected by means of a 50 ohm coaxial cable to the grid of tube 136 which tube 136 together with the previously mentioned tube 126 constitutes a second two-tube gated amplifier such as that of the previously described tubes 118 and 119 for the I.F. sample, the distinction being that the tubes 136 and 126 are gated in a different fashion to block the storage loop for a 1 microsecond period every 20 microseconds to wipe out stored signals to make way for the introduction of new signals from the radar system 11 as introduced via the I.F. sample gate. Thus it is seen that with tubes 119 and 126 connected with their anodes in parallel, signals are available continuously, being delivered to tube 128 as either new signals during the 1 microsecond sample periods and obtained from tube 119 or recirculated loop signals during the 19 microseconds period and obtained from tube 126.

Gating pulses for the recirculate gate of tubes 136 and 126 are applied individually in this instance to the control grids of the tubes as obtained from terminals 137 and 138 which are identical signals obtained separately from the sampler gate pulse generator 19, more specifically from the component 56 thereof. These gating pulses are negative going pulses of 1 microsecond duration separated by an intervening period of 19 microseconds with the gating tubes 136 and 126 thus being conductive during the intervening 19 microseconds periods but nonconductive by virtue of the negative potential applied to their grids during the 1 microsecond pulses.

The manner of derivation and utilization of the gating signals was chosen to insure that the *gated* tubes when in the conductive condition will not be influenced by any residual current in the gating tubes which are operated completely cut-off during this period.

Output from the system is obtained from the anode circuit of tube 129 by virtue of the connection of line 139 through video detector 31. This unilateral impedance device which is typified as a 1N34 type crystal is connected to the secondary of the output coupling transformer 141 for tube 129 which also drives the delay line 25.

It is believed desirable to point out a few additional features of the storage loop to emphasize the frequency and bandwidth characteristics thereof. For example the tubes 136 and 126 are more than a mere two-stage gate but actually constitute what is known in the art as a staggered pair of amplifiers in which the tuning of the various transformers in the circuits are to slightly different frequencies to broaden the overall response characteristics thereof. Additionally the tuned circuits associated with the transformers 127, 142 and 141 constitute a staggered triple in which the three circuits are tuned to slightly different frequencies again to improve the frequency bandwidth characteristics thereof. Likewise the tuned circuits connected to the grid of tube 130, the grid of tube 131 and the grid of tube 132, whether the circuits are located in the anodes or grids specifically, constitute a staggered triple in which again the circuits are tuned to slightly different frequencies to improve the frequency bandwidth characteristics thereof. The remaining frequency selective components, those associated with the anode of tubes 132 through 134 are of a form known as an "unequal Q wideband circuit" in which the Q's of the individual circuits are adjusted in such a way as to provide desirable frequency response characteristics.

In this connection it is noted that all tuned circuits are loaded by extremely low resistors to provide the desired 15 megacycle bandwidth for the typical embodiment of the present invention. Loading for the anode of tube 135 is obtained through the coaxial cable **135–*a* which is inserted merely for convenience in the location of separate chassis if such is desired, the short coaxial cable 135–*a* being terminated in a low impedance coupling arrangement which also loads the anode of tube 135**.

The line 139 contains the output subsequently delivered to the Doppler filter bank 15 of FIG. 3. Further it is to be noted that the apparatus of FIG. 5 includes as tube 129 a type 12BY7 which is a high transconductance, high current type tube with its anode transformer 141 loaded by an unusually low resistance of 220 ohms to provide the low impedance and high power capabilities required to drive the delay line 25.

The delay line 25 itself has previously been indicated as being of the quartz type providing a total of 1250 microseconds storage capabilities.

Again as in the apparatus of FIG. 4, the recirculate gate pulses applied at terminals 137 and 138 are delivered through inductances **126–*a* and 136–*a* to provide decoupling of the carrier frequency signal from the terminals 137 and 138**.

Figure 6:
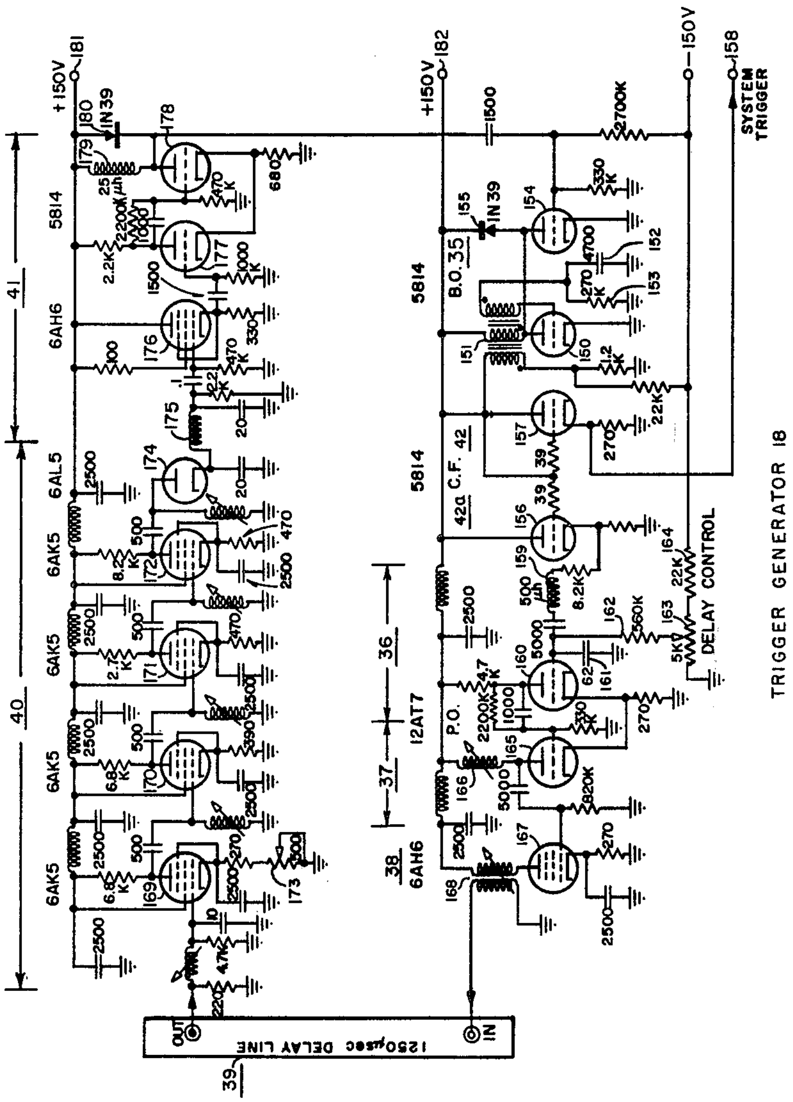

The trigger generator 18 is shown in typical schematic form in FIG. 6 to which attention is now directed. This apparatus of FIG. 6 is again, as was FIG. 5, a closed loop containing a delay line 39 which is fed with signals which are obtained by amplifying the output of the delay line itself.

The description of this loop may properly begin as with the apparatus of FIG. 2 with the blocking oscillator tube 150 which is the principal component of the block 35 of FIG. 2, being half of a dual triode electron tube of the type 5814 having a blocking oscillator transformer 151 connected in the anode and grid circuits thereof in more or less conventional fashion. The time constant of the blocking oscillator is normally set by the grid circuit capacitance 152 and the resistance 153, such circuit being normally proportioned in such a manner as to cause the circuit to free run at a period somewhat in excess of the repetition frequency of the overall loop circuit which is 1251 microseconds. Thus it is possible to cause controlled premature triggering of the blocking oscillator by the trigger tube 154 whose anode is connected to the anode of tube 150 and whose grid is driven from the amplified output of the delay line 39. A unilateral impedance device 155 is connected to the anodes of tubes 150 and 154 to provide suppression of signals of undesired polarity existing across the anode winding of the blocking oscillator transformer 151.

The tertiary winding of the blocking oscillator transformer 151 is connected to the grids of a pair of cathode follower circuits of tubes 156 and 157. By this means a high impedance is presented to the blocking oscillator transformer to avoid undesired loading thereof and yet at the same time a low impedance output is provided at the cathodes of tubes 156 and 157. The cathode of tube 157 is connected to line 158 which is identified as the "system trigger line" which is connected to the blocking oscillator 50 and limiter and pulse shaper 64 of FIG. 2. This basic system trigger pulse is a pulse of the order of 1 microsecond duration occuring at the recurrence period of 1251 microseconds which is the basic recurrence frequency of the overall system. The same sort of pulse as the system trigger pulse is obtained at the cathode of tube 156 for application to a small inductance 159 which is followed at the grid of tube 160 by a small capacitance 161 together with the grid bias control network of resistances 162, 163 and 164. By this arrangement, a slight integration of the signal occurs at the grid of tube 160 to produce a sloping wavefront by means of which it is possible to vary the D.-C. bias potential to control the instant in time at which the pulse causes the unblocking of tube 160. Thus an additional delay of the order of 6 microseconds or slightly shorter and which can be adjusted in length is obtainable to add to the 1245 microseconds delay of the delay line 39 and to overall loop delays to produce the overall basic loop delay of 1251 microseconds. Although this discussion does not necessarily mean that there is no other delay inserted by the overall timing loop, it is merely necessary that whatever delay is associated in the total timing loop due to various components involved is such as to produce an overall period of 1251 microseconds.

The previously mentioned tube 160 together with tube 165 constitutes a Schmitt trigger circuit by virtue of the connection of the grid of tube 160 to a potential which is close to ground potential and the connection of the grid of tube 165 to a positive potential obtained by a voltage divider connected between ground and the anode of tube 160. Thus the circuit is seen to reside in a normal state wherein tube 165 is conductive and tube 160 is cut off. The anode of tube 165 is connected through an inductance 166 to a source of anode supply potential. This circuit is of the high "Q" type and is not shunted by any form of damping device other than the anode of the tube itself, the grid resistance of the succeeding tube 167 being so large as to provide no substantial damping of the inductance. Thus this inductance will resonate at a frequency determined by the size thereof and the capacitances of the associated circuitry whenever it is shock excited into a damped oscillatory wave by a unit function as occurs when the normally conductive tube 165 is suddenly extinguished upon application of the delayed trigger pulse to the grid of tube 160 rendering tube 160 conductive for a brief instant as determined by the duration of the blocking oscillator pulse and the bias of tube 160.

The damped oscillation existing at the anode of tube 165 is applied by means of the coupling circuit to the control grid of tube 167 which tube has a coupling transformer 168 in the anode circuit thereof to provide the desired impedance required for driving the delay line 39.

The output from the timing delay line 39 is applied to a four-stage intermediate frequency amplifier containing as the primary components thereof the tubes 169, 170, 171 and 172. This amplifier is also of high gain and fairly wide band characteristics, however, its bandwidth need not be as wide as the amplifier in the sample storage loop because at this point all that is required is its ability to pass the timing pulse without undue distortion, the wide band produced in the manipulation of the storage signals not existing at this point. An additional component is a variable cathode resistance 173 in the cathode circuit of tube 169 which provides a control over the overall gain of the post amplifier and hence the loop itself. The post amplifier of FIG. 6 together with detector 174 corresponds to the component 40 of FIG. 2. The detector 174 provides rectification of the I.F. timing pulse signal to obtain at the cathode thereof a positive polarity pulse dependent on the modulation of the carrier wave supplied to the delay line. The cathode of detector 174 is connected through a filter inductance 175 to the grid of tube 176 which is a cathode follower circuit.

The cathode of tube 176 is coupled to the grid of tube 177 which together with tube 178 forms a Schmitt trigger circuit for squaring of the pulses in the output of the post amplifier as detected prior to delivery thereto. Tube 178 has an inductance 179 in the anode circuit thereof which is shunted by a unilateral impedance device 180. In this circuit the normal condition is that wherein tube 178 is conductive and tube 177 is cut-off by virtue of the connection of the grid of tube 177 to ground through a coupling resistance and the grid of tube 178 to a voltage divider connected between the anode of tube 177 and ground. Thus in the normal condition of this trigger circuit, tube 178 conducts a substantial amount of current which flows through the inductance 179. When the timing pulse is delivered from the delay line through the post amplifier, detector, and peak selector, the resulting positive voltage at the grid of tube 177 causes tube 177 to conduct cutting off tube 178. At this instant in time a resonance effect takes place at the anode of tube 178 due to the inductance 179 and the natural tendency of the current flowing therein to continue. This causes a pulse of high voltage to be produced at the anode of tube 178 whose duration is dependent to a large extent on the magnitude of normal current flow through tube 178 and on the values of the inductance 179 and the associated capacities of the circuit. As a result of this it is possible to make the pulse shorter in duration than the pulse delivered to the grid of tube 177 so that a sharper amplitude pulse of uniform shape and free from noise is generated and applied to the grid of tube 154 which as previously mentioned is the keying tube for the blocking oscillator of tube 150.

The circuit of FIG. 6 is supplied with suitable anode power at the potential level of 150 volts at terminals 181 and 182. In accordance with the previous comment these two terminals could be the same and could be the same terminal used for supplying potentials to the previous schematic diagrams with the use of suitable decoupling and low impedance supply circuits in accordance with established engineering principles in order to obtain the desired supply potentials at low impedance to avoid undesired coupling of the circuits through the power supply.

Figure 7:
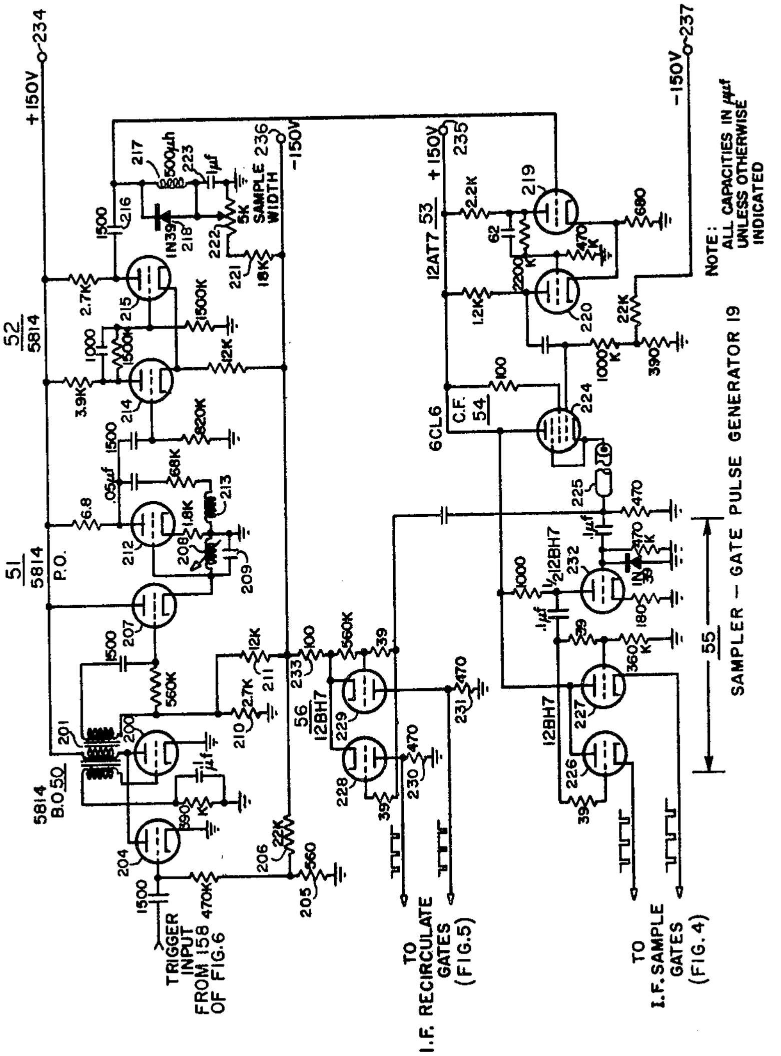

Sampler gate pulse generator 19 of FIG. 2 is shown in FIG. 7 to which attention is now directed. This apparatus contains a blocking oscillator tube 200 having the primary winding of a transformer 201 connected in the anode circuit thereof and a second winding of the transformer connected to the grid of the tube. In conventional blocking oscillator fashion the second, or grid winding of the transformer is also connected to a resistance-capacitance time constant circuit which determines the free running frequency of the blocking oscillator operation. Also connected to the blocking oscillator tube 200 is the anode of a keying tube 204 which is normally maintained in a blocked or nonconductive condition by virtue of the connection of the cathode thereof to ground and the grid to a voltage divider consisting of resistances 205 and 206 connected between ground and a negative potential of 150 volts.

Positive pulses are applied to the grid of tube 204 by virtue of the connection thereof to the system trigger line corresponding to line 158 of FIG. 6 which is connected to the cathode of the cathode follower tube 157 of that figure. Upon the application of such positive pulses to the grid of keying tube 204, tube 204 becomes momentarily conductive to cause a surge of current through the primary winding of transformer 201 which initiates blocking oscillator action within tube 200 at an instant in time which is prior to the normal time that tube 200 would cause a cycle of operation on its own.

Transformer 201 has a tertiary winding thereon connected to the grid of an oscillator keying tube 207 the cathode of which is connected across a tuned circuit of inductance 208 and capacitance 209, the inductance 208 providing a D.-C. path to ground for the cathode of tube 207. Normally tube 207 is also maintained in a nonconductive state by virtue of the connection of the grid thereof to a suitable below cut-off biasing potential as obtained from a voltage divider of resistances 210 and 211 connected between ground and the minus 150 volt biasing potential source. Thus tube 207 is normally held nonconductive however, by appropriate connection to the tertiary winding of transformer 201 so that a pulse of positive polarity and suitable amplitude is supplied to the grid of tube 207 as a result of the cycle of operation of the blocking oscillator of tube 200, tube 207 is driven to momentary conduction in substantial coincidence with the operation of the blocking oscillator tube 200.

The inductance 208 and capacitance 209 are the principal frequency determining elements in an oscillator 51 having the electron tube 212 which is connected in a suitable oscillator circuit employing in addition to the inductance 208, a feedback inductance 213 in an oscillator circuit of high stability which is in its normal state continuously operative. This normal state is interrupted during the instants in time at which tube 207 is conductive producing a heavy damping of the oscillator to cause it to cease its oscillatory action. Following the termination of each brief instant of conduction of tube 207, the oscillator of tube 212 again resumes its oscillatory action starting out with a uniform phase in its signal. The oscillator of tube 212 typically operates at a frequency of 50 kilocycles with the blocking oscillator of tube 200 providing a 10 microseconds pulse to tube 207 to produce the phasing action of the oscillator of tube 212.

The anode of tube 212 is coupled to the grid of tube 214 which together with tube 215 provides a square wave generator known as a Schmitt circuit which provides zero crossing amplitude selection of the sine wave and limiting action to produce at the anode of tube 215 a square wave having a 20 microsecond period. In this Schmitt circuit tube 214 is the normal tube that would be cut off in the absence of an input signal in which conditions tube 215 would be conductive by virtue of the connection of the grid of tube 214 to ground and the grid of tube 215 to a voltage divider connected between the anode of tube 214 and ground. In this circuit with tube 214 being driven by a sine wave of 50 kilocycles frequency, tubes 214 and 215 each have substantially equal 50 percent duty cycles so that it is not exactly proper to speak of either as having the normal conductive state. In any event the square wave produced at the anode of tube 215 is applied to a differentiator circuit consisting of coupling capacitance 216 and inductance 217 which differentiates the square wave to obtain the characteristic alternate positive and negative polarity spikes. Unilateral impedance device 218 suppresses the negative polarity spikes so that only the positive polarity pulses are passed on to the next stage.

The previously mentioned differentiator circuit is direct coupled in the grid circuit of tube 219 which together with tube 220 constitutes a Schmitt trigger circuit whose normal conductive condition is that with tube 219 cut off and tube 220 conductive by virtue of the grid voltages maintained thereon. It is thus readily seen that with the proper selection of the amplitude of the differentiated pulses obtained from the differentiator circuit 216, 217 and 218, it is possible to drive tube 219 to momentary conduction to produce a one microsecond pulse from the trigger circuit. It is desired that these pulses have precise duration characteristics and also preferably that some means be provided for adjusting the duration of these pulses. This adjustment is provided within the differentiator circuit by the additional components consisting of a voltage divider of resistances 221 and 222 and filter capacitance 223 by virtue of which with the direct connection through inductance 217 to the grid of tube 219 it is possible to vary the bias voltage maintained on tube 219. By adjustment of this potential it is possible to determine the amount of the differentiated positive spike that is above cut-off potential of tube 219 and hence the duration of the period of conductivity of tube 219. It is possible then to adjust the biasing potential on tube 219 by means of the resistance 222 which typically is a potentiometer to control precisely the duration of the basic timing pulse which provides the sample gating period.

In comparison of FIG. 7 to FIG. 2 then, it is seen that the blocking oscillator tube 200 corresponds to the blocking oscillator 50 of FIG. 2 and the oscillator tube 212 is the principal component of the pulsed oscillator 51 of FIG. 2. The Schmitt trigger circuit of tubes 214 and 215 is the principal component of the first limiter and pulse shaper 52 of FIG. 2 whereas the second Schmitt trigger circuit of tubes 219 and 220 corresponds to the second limiter and pulse shaper 53 of FIG. 2.

Gating of the I.F. sample gate 30 and the I.F. recirculate gate 27 of FIG. 2 requires a sizeable amount of power because of the bandwidths and consequent low impedance values of the circuits involved. Thus provision is made for amplifying the basic one microsecond pulse obtained at the anode of tube 220 and of supplying it through coaxial transmission lines if desired so that the gate amplifier tubes could be located if desired in greater proximity to the I.F. sample gate 30 and the I.F. recirculate gate 27. This provision is not altogether essential if all components are mounted in close proximity to each other on the same chassis, however, in some instances for flexibility and ease of maintenance to mention a few reasons, it is usually desired that the apparatus be contained in a plurality of smaller sub-chassis assemblies. To this end the output obtained at the anode of tube 220 is applied first to a cathode follower tube 224 which is employed to drive a coaxial cable transmission line 225 which may be only a few feet or even inches in length which is employed for "remote" coupling of the portion of the sampler gate pulse generator 19 thus far described to the balance of the circuit shown in FIG. 7.

The basic gate amplifier and control tubes are identified by the reference characters 226 and 227 which are in separate cathode follower circuits driven by the same signal to provide the gating of the I.F. sample gate 30, the specific schematic being typified in previously described FIG. 4, with terminal 121 of FIG. 4 being typically connected to the cathode of tube 226 and terminal 122 of FIG. 4 being connected to the cathode of tube 227. As previously mentioned the pulses at this point are applied to the cathodes of the I.F. sample gate tubes 118 and 119 and to produce conductivity or cathode gating of these tubes 118 and 119 for the 1 microsecond periods at intervals of 20 microseconds total must provide negative 1 microsecond pulses in which the space between the pulses is occupied by the maintenance of a cut-off potential at the cathodes of tubes 118 and 119. Thus in this inter-pulse spacing, tube 226 and tube 227 must be heavily conductive through the cathode resistors 118*a* and 119*a* of FIG. 4 for the tubes 118 and 119, respectively, to maintain these tubes cut-off.

In addition to the gating amplifiers 226 and 227 of FIG. 7, two additional gating amplifier tubes 228 and 229 are indicated. These two amplifier tubes provide the drive for the recirculate gate 27 which corresponds to the tubes 126 and 136 in the schematic of FIG. 5. Tubes 126 and 136 are grid gated by the maintenance of their grids at substantially ground potential during the inter-pulse period and the application to the grids of a negative potential during the sample pulse itself. Tubes 228 and 229 are thus connected with their anodes grounded through resistances 230 and 231 and the anodes of tubes 228 and 229 typically connected to terminals 137 and 138 of FIG. 5.

It is thus seen that negative pulses are to be produced at the anodes of tubes 228 and 229 and also negative pulses are to be produced at the cathodes of tubes 226 and 227. With pulses of the same polarity thus to be derived at opposite ends of electron tubes it is apparent that some means must be provided for inverting the basic trigger pulse applied in this case through the cathode follower tube 224 and coaxial cable line 225 of FIG. 7. To this end the apparatus of FIG. 7 contains an inverter tube 232 whose grid is connected to the output of the coaxial cable 225 and which is driven by the positive pulses obtained therefrom to produce negative pulses at the anode of tube 232. The anode of tube 232 is coupled by means of suitable resistance capacitance coupling devices to the grids of tubes 226 and 227 in parallel. Thus tubes 226 and 227 are driven with equal amplitude identical signals. By cathode follower action in tubes 226 and 227 the desired negative pulses are obtained at the cathodes for operation of the I.F. sample gates.

The gating tubes 228 and 229 being effectively anode loaded produce the polarity inversion without requiring the separate inverter tube 232, thus their grids are driven directly from the output of the coaxial cable 25 and their cathodes are connected through a small current limiting resistance 233 to the source of negative supply potential.

In correlating FIG. 7 and FIG. 2 further it thus appears that the cathode follower of tube 224, FIG. 7 corresponds to the cathode follower 54 of FIG. 2, this device driving the sample gate amplifier 55 of FIG. 2 corresponding to the inverter 232 and amplifiers 226 and 227 of FIG. 7 and also driving the I.F. recirculate gate pulse amplifier 56 of FIG. 2 corresponding to the amplifier tubes 228 and 229 of FIG. 7.

As with previous schematic diagrams discussed in detail, the circuit is provided with suitable supply potentials, in particular terminals 234 and 235 which are provided for the application of a positive 150 volts supply and terminals 236 and 237 are supplied for the application of a negative potential of 150 volts. Again conventional good engineering design principles are normally applied to secure potential sources which do not provide undesired coupling between the various components.

Schematics corresponding to the block diagram of FIG. 2 have now been described in detail for every component except the antenna 10 and the coherent radar 11 it being understood that these are devices which are now well known in the art and which need not be described in detail at this point. As to the schematic diagram of components in FIG. 3, detailed discussion of typical schematics now follows with particular attention being directed for the moment to FIG. 8 which contains typical schematic diagram for apparatus corresponding to the Doppler filter system 15, the peak selector 16 and impedance matching device 17 of FIG. 3.

Figure 8:
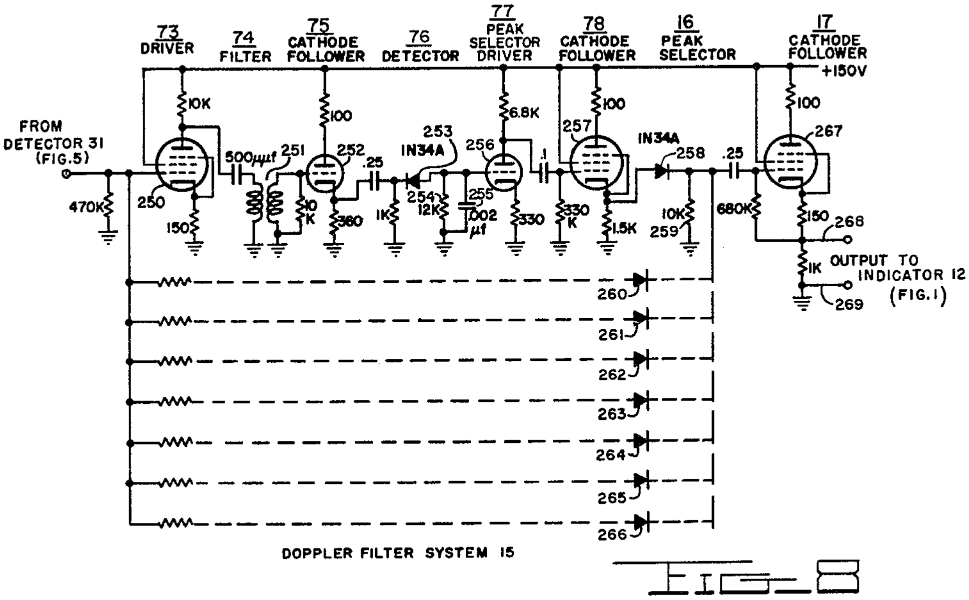

In FIG. 8 the tube 250 is a plate loaded amplifier whose grid is supplied with the output of the video detector 31 of FIG. 2. Driver tube 250 is shown as providing a fairly low impedance source for the filter which is a double tuned bandpass transformer 251 which is an equal "Q" device having good selectivity and sharp passband skirts. The output from filter 251 goes to the grid of an electron tube 252 which is connected in a cathode follower circuit having high input impedance to avoid upsetting the selectivity characteristics of the filter 251 and low output impedance to drive detector 253. Detector ouput which is of the negative polarity by virtue of the manner of connection of the rectifier is applied to a time constant filter circuit of resistance 254 and capacitance 255 which removes the carrier frequency present in the output thereof and is amplified by an electron tube circuit containing the triode type electron tube 256. This negative polarity signal reduces conductivity of tube 256 in comparison to what it would be in the absence of an applied signal so that automatic biasing of tube 256 is maintained, the tube being operative as an amplifier. Signals so amplified by tube 256 are applied to the cathode follower circuit of tube 257. Connected to the cathode of 257 is a unilateral impedance device 258 connected as shown to apply positive polarity signals to the load resistance 259.

The apparatus of FIG. 8 thus far described corresponds to the apparatus of FIG. 3 in the following manner. The driver tube 250 corresponds to the filter driver 73 of FIG. 3, the filter 251 corresponding to the filter 74 of FIG. 3 and the cathode follower of tube 252 corresponding to the cathode follower 75 of FIG. 3. The detector 253, the driver tube 256, and the cathode follower 257 correspond respectively to the detector 76, peak selector driver 77 and cathode follower 78 of FIG. 3. As indicated in both FIG. 3 and FIG. 8, the typical apparatus bearing component identification from 250 through 258 is actually only one of a plurality of filter paths the typical apparatus being shown to include 7 additional filter paths all driven in parallel from detector 31 and supplying outputs to the individual detectors 260, 261, 262, 263, 264, 265 and 266 of FIG. 8 which together with the detector or unilateral impedance device 258 and the load resistance 259 constitute the principal components of the peak selector 16 of FIG. 3. By virtue of the common cathode connection of all of the detector elements 258 and 260 through 266, whichever diode element is conductive in the maximum amount places such a high positive potential across the load resistance 259 as to effectively block all other diodes and hence alone appear as the entire signal appearing across the load resistance 259. The load resistance 259 is connected to the grid of a cathode follower output impedance matching tube 267 which corresponds to the impedance matching device 17 of FIG. 3 the output being taken in the cathode circuit of tube 267 at terminals 268 and 269 for delivery to the conventional radar PPI indicator 12 of FIG. 3.

Figure 9:
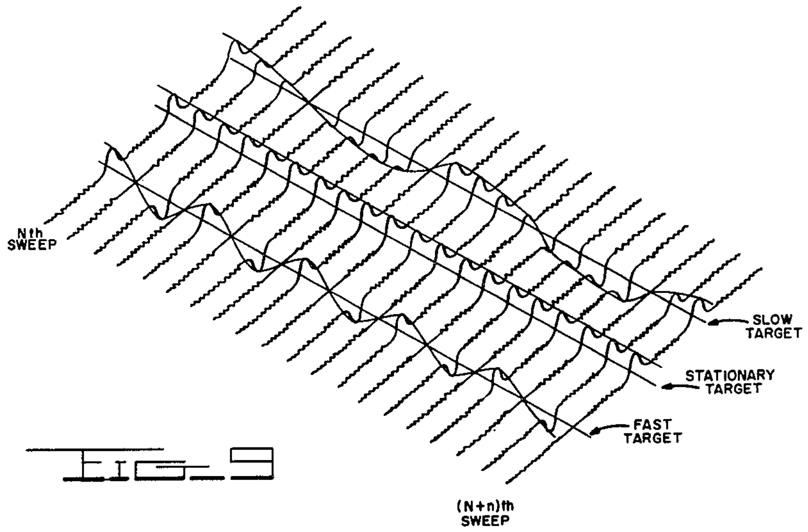

Another form of explanation of the operation of the apparatus of the present invention previously described is best presented in conecteion with FIG. 9 to which attention is directed. This presentation shows a coherent video signal with the representations being made therein for a plurality of successive radar sweeps for three different types of targets at different ranges separated such as to fall within separate range gates of the system so as not to introduce any confusion or complications from that standpoint. The signals shown are roughly the output of a coherent radar system video detector for 20 successive radar sweeps each typically beginning at the lower left hand ends of the lines shown each proceeding with time toward the upper right hand corner of the figure such that the sweep (N) in the upper left hand corner of the figure is the first in point of time with the next one adjacent being second in point of time and so on up to the $(N+n)$th sweep. A zero range rate object is shown in the middle of the sweeps. This object because of the fixed position thereof relative to the radar system always returns a coherent video signal which is at the same phase relative to the start of the radar pulse. It will be recognized that although a stationary target has been illustrated in the signal patterns of FIG. 9, in the embodiment described the absence of a 0–50,000 kc. section in the filter system 15 would not permit response to such an object.

Where a target is in motion relative to the radar system, the uniform phase condition for successive sweeps is no longer apparent, the phase variation and the rate of such variation being dependent upon the rate of relative motion between the radar system and the target. To illustrate this a high range rate target has been indicated in FIG. 9 as that being closest to the start of the range sweep, that is the target nearest the radar site. This target is shown as providing a signal varying at a rather rapid rate such that at one radar pulse (N) it is a maximum in one polarity and reaches an opposite polarity maximum by the time the third or $(N+2)$ pulse occurs. The result is a large amplitude variation from pulse to pulse in the coherent video signal resultant from this fast target. Where 20 pulses are available as shown here it is seen that five complete cycles of variations are available over the 20 pulses to provide improved MTI operation over that which would be possible if one were limited as in the prior art merely to comparison of two successive pulses.

In addition, FIG. 9 shows a typical variation in signal for a low range rate target at a greater distance from the radar site than the fast target. Again the phasing varies from pulse to pulse and it is shown that approximately two cycles of variation occur over the 20 pulse period.

Further explanation of the operation of the present invention may be given to advantage in connection with an explanation of typical waveforms present in the apparatus of the invention. To this end attention is now directed to FIG. 10 which shows waveforms associated with the trigger generator 18 of FIGS. 2 and 6 since these waveforms establish the basic repetition frequency of the system. Waveform 300 shows the output of the timing delay line 39, a typical waveform which would be present after amplification and detection at the grid of tube 176.

This waveform contains among a representation of noise, a pulse 301 occurring at the time $t_1$ following the passage of a period T of 1250 microseconds from an initial time $t_0$. Waveform 302 shows at the region identified by the reference character 303 the sharpened leading edge and shortened duration of a triggering pulse delivered to the blocking oscillator 35 at the grid of tube 154 with the noise removed, this triggering pulse 303 being that employed to produce a cycle of operation within the blocking oscillator 35 to produce the blocking oscillator output of line 304 at the grids of tubes 156 and 157. The timing pulse 303 produces the pulse 305 in waveform 304 it being understood that in waveform 304 and those subsequent in this figure an additional pulse of operation indicated as corresponding to 306 is shown such pulse being that which when applied through the balance of the trigger circuit to the timing delay line 39 caused the output pulse 301 in waveform 300.

Thus the pulses 305 and 306 are shown separated in point of time by a period of 1251 microseconds, the timing pulse repetition period. The blocking oscillator pulses of line 304 when delivered to the basic system trigger terminal or line 158 (FIG. 6) for the system appear as in line 307 as sharp leading front pulses appearing at 1251 microseconds time spacing their leading edges being in correspondence with the time instants periods $t_0$ and $t_1$.

Line 308 shows the delayed trigger pulses as applied in positive polarity to the pulsed trigger carrier oscillator 37 which point of application corresponds to the grid of tube 160 in FIG. 6. The resulting damped oscillation produced by the pulsed trigger carrier oscillator 37 in greater particularity at the anode of tube 165 and delivered to the grid of tube 167 is shown in line 309. This represents the carrier frequency trigger pulse which is amplified in the delay line driver 38 and applied to the timing delay line 39 for delivery therethrough. It is these pulses which when demodulated in the detector portion of the post amplifier and detector 40 produce the pulse 301 of waveform 300. It is well to note that these pulses are deliberately shown to be delayed relative to the basic time periods $t_0$ and $t_1$, however it is the overall delay of the timing loop that is important and by the time these signals are delivered again to the blocking oscillator 35 they are in correspondence with the periods $t_0$ and $t_1$ etc., of waveforms 300 and 304.

Figure 10:
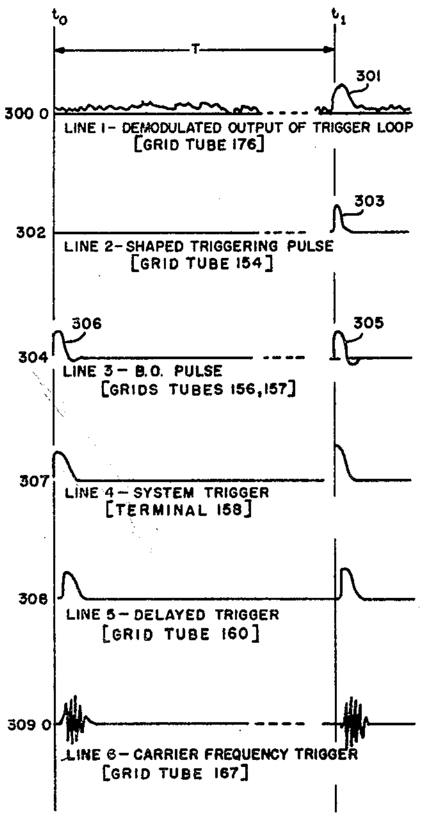
Figure 11:
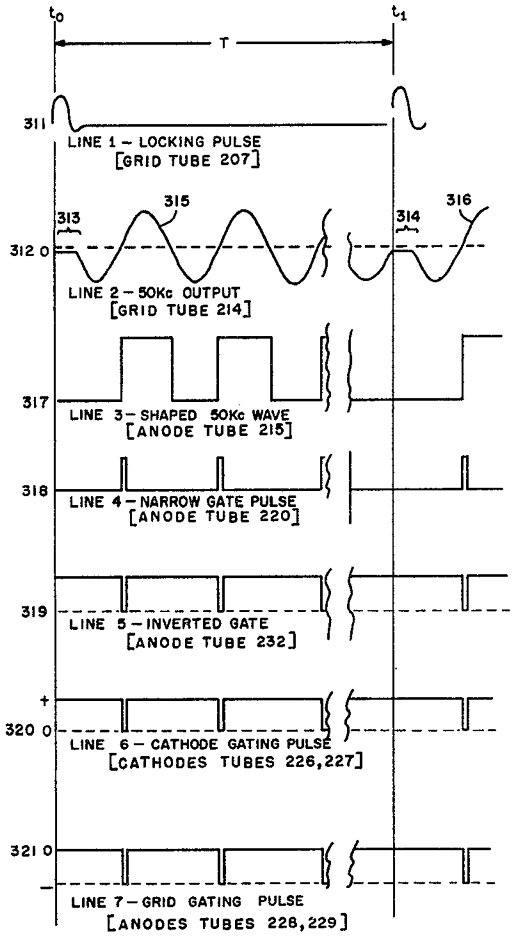
FIG. 11 shows waveforms of typical signals existent in the sampler gate pulse generator 19 of FIGS. 2 and 7.

The first point where the trigger pulse signals from the trigger generator 18 are used is in the sampler gate pulse generator 19 (FIG. 7), waveforms of which are shown in FIG. 11 to which attention is now directed. Again in this figure the representation is made to the same basic time period and instants T, $t_0$ and $t_1$ of FIG. 10. The system trigger pulse when delivered to the blocking oscillator 50 synchronizes the operation of that component to produce the typical blocking oscillator output pulses shown in line 311 of FIG. 11 which represents the output of the blocking oscillator 50. These pulses when delivered to the 50 kc. pulsed oscillator 51 occurring as they do at a recurrence period of 1251 microseconds cause a periodic damping of the oscillator 51 to produce the portions of waveform 312 identified by reference characters 313 and 314 which show a period of inactivity of the oscillator in its production of the 50 kc. waveform portion 315. To avoid undue extension of the waveforms of FIG. 11 this waveform of line 312 and those subsequently to be described are interrupted for a portion thereof showing only the portions in the regions of time periods $t_0$ and $t_1$. The sinusoidal waveform portion 315 of waveform 312 occurs at a 50 kilocycle frequency which corresponds to a period of 20 microseconds. It is to be observed that at the end of each of the portions 313 and 314 which correspond to the duration of the blocking oscillator pulse the sinusoidal portion of waveform 312 identified by characters 315 and 316 always begins at a fixed phase relationship.

Upon application of the phase locked sinusoidal waveform of line 312 to the grid of tube 214 of the first limiter and pulse shaper 52, the sinusoid is converted into a square wave with zero crossing amplitude selection and limiting, the square wave having a 20 microseconds period corresponding to the frequency of the sine wave. This wave is shown in line 317 of FIG. 11 and when it is differentiated by the coupling circuit between tubes 215 and 219 of FIG. 7 the result is a positive pulse from the second limiter and pulse shaper 53 at the anode of tube 220 which is shown in line 318, the narrow pulse being of the desired 1 microsecond duration for the sampling period and the storage loop recirculation blocking period. Line 318 shows the waveshape when this positive pulse is inverted as occurs in the recirculate gate amplifier tubes 228 and 229 and the inverter tube 232 of FIG. 7. The inverted gate of line 319 is shown in two separate additional lines 320 and 321 which indicate the polarity levels to point out the difference in potentials of the signals as used at the sample gate and the recirculate gate.

Waveforms existing at these gates and other waveforms existent in the storage loop (FIG. 5) are shown in waveforms of FIG. 12 to which attention is now directed. The waveform of line 325 shows the echo modulated carrier delivered to the I.F. sample gate 30 from the sampler carrier generator 13. As shown this waveform contains low level noise portions however a short time following each of the time instants $t_0$ and $t_1$ there is shown a typical radar echo pulse of 20 microseconds duration resultant to the radar transmitted pulse of 20 microseconds duration. Again in the waveforms of FIG. 12 correspondence at the time instants $t_0$ and $t_1$ is maintained. One important point to note, however, is that the radar pulse echoes occur at a repetition period of 1251 microseconds whereas the spacing between the time instants $t_0$ and $t_1$ is still equal to the basic storage loop period of 1250 microseconds.

Under control of the sample gating pulses of line 320, FIG. 11, the radar pulses are sampled for a period of 1 microsecond duration as shown in line 326 the sampling occurring at a recurrence period of 20 microseconds with the response at typical 20 microseconds periods being shown by the signals identified by reference characters 327, 328, 329 and 330. Note carefully that the samples 327 and 330 correspond to the same target occurring however for successive radar pulses. Signal sample 328 corresponds to a sample taken at a second 20 microseconds period and hence differs from that taken for sample 327 by 20 microseconds. The sample level at 328 and 329 corresponds in general to the noise level that will exist in the absence of return signals from targets and hence when all of these one microsecond samples are placed side by side the result is a signal of the form shown by line 331 in which the basic signals again identified by the reference characters 327 and 330 are present within a background of noise. It is this signal of line 331 that is amplified and delivered to the storage delay line 25. With operation beginning at the instant in time $t_0$ the sample 327 which is taken of the first radar echo occurring after time $t_0$ is all that is present following time $t_0$, however, following time $t_1$ the sample taken for the radar pulse following time $t_1$ is identified by the reference character 330 is supplied to the delay line immediately following the sample 327–1 on its second pass or delivery to the delay line so that the two signals 327–1 and 330 appear in time sequency, sample 327 being identified by the –1 to point out its second occurrence nature at this point. It is very important to note that these signals 327–1 and 330 are both present in the storage system at this point being adjacent to each other in point of time. As these two signals traverse the loop repeatedly, this time relationship will be maintained with the signal 327–1 always occurring in the one microsecond immediately preceding the 1 microsecond duration of signal 330. This "drift" of the storage of old signals relative to the application of each new signal, signal 330 being considered for the moment a new signal for reference purposes, is caused by the purposeful difference of 1 microsecond in the storage loop period of 1250 microseconds as compared to the radar pulse period of 1251 microseconds. It is thus seen that when operation over 20 successive pulses has occurred there will be 20 successive pulses of the type 327–1 and 330 located in the delay line system in a single 20 microseconds increment which signals remain together in this fashion for the operation of the system.

If the system were to be considered as operative only with these two pulses for the moment, the detected envelope resultant from the waveform of line 331 appears at the output of the video detector 31 as shown by line 331–A with amplitudes wherein corresponding clearly to the noise level and the levels of the various signals 327, 327–1 and 330.

The storage within the system cannot occur at infinitum. Signals must be removed to make way for the storage of new signals, and the removal of old signals no longer related to antenna orientation. This removal is accomplished always by removing the oldest stored signal in the operation of the I.F. recirculate gate 27. The recirculate gate itself is not represented in FIG. 12, however, the effect of its operation upon the noise waveform is shown in line 332. As indicated therein the noise has momentary periods of interruption indicated by reference characters 333, 334, 335 and 336. The interruption in noise corresponding to the portion identified by the reference character 333 represents the occurrence of the recirculate gate pulse occurring coincidentally with the recording of the sample 327 of lines 326 and 331. Likewise the blanks 334, 335 and 336 correspond to the blank periods occurring in the time coincidence with the recording 328, 329 and 330. Thus as shown the blank period 336 corresponds to the recirculate gate occurring following the second pass signal 327–1 which is shown in line 332 at which time the I.F. sample gate 30 is open to deliver the sample 330 of line 326 to the delay line driver 26. Thus it is seen that the signal 327–1 is not erased by the gate at 336 but rather is retained in the system to continue its circulation therethrough, its erasing not occurring until the signal 327 has reached the —19 state which means it has made its 19th pass through the system.

The delay line output is typified in line 337 showing its signal 327–1 which appears in the output responsive to the application of the sample 327 of line 331 at the input of the delay line. This signal does not contain a sample following the period $t_0$ because operation was considered to begin at $t_0$ and a signal had not been delivered to the delay line 25 prior to period $t_0$.

In FIG. 13 the system trigger signal of line 307 FIG. 10 is repeated in line 350. As shown this line contains the two trigger pulses 351 and 352 whose leading edges correspond to the instants in time $t_0$ and $t_1$, being separated in time by the 1251 microseconds period T. This basic system trigger signal when delivered to the limiter and pulse shaper 64 at grid of tube 107 in FIG. 4 takes the shortened appearance in the line 353 where it is shown as pulses 354 and 355, again with the same basic occurrence and spacing of the system trigger pulses.

This shaped trigger signal of line 353 is that applied to the oscillator damping tube 63 of FIG. 2 to cause the occurrence of the damping current pulses shown in line 356 which are applied to the phase locked oscillator 62, the damping pulses being indicated by the reference characters 357 and 358. The oscillatory output of the phase locked oscillator 62 is indicated in line 359 and contains a carrier wave identified in general by the reference character 360, this wave having portions 361 and 362 during the occurrence of the damping pulses 357 and 358 in which the phase locked oscillator is inoperative and hence does not produce the carrier wave 360. At the end of each of the oscillator damping pulses 357 and 358 this phase locked oscillator 62 begins its operation always starting out with a uniform phase of the carrier wave oscillations. Actually the signals of waveform 359 and waveforms 325, 331, 332 and 337 of FIG. 12 are of the same frequency, waveform 359 being shown to expanded scale to show the effect of the damping pulses.

With the phase locked oscillator output applied to the modulator 60, the modulator 60 produces an amplitude modulated I.F. carrier signal such as that indicated in line 363 which is characterized by several features. In particular this line contains the inactive portions 361 and 362 corresponding to the occurrence of the damping pulses 357 and 358. In addition this pulse contains the carrier signal 360 of waveform 359 and a third characteristic the enlarged amplitude portion 364 of 20 microseconds duration which corresponds to a radar return signal at a selected range, this radar signal 364 corresponding to the radar echo signal following the interval $t_0$ in line 325 of FIG. 12. Typically this signal is of the same amplitude and of 20 microseconds duration imposed by the radar pulse duration and occurs at the same time delay relative to $t_0$ as in FIG. 12 however, it is shown of a shorter duration in FIG. 13 to avoid excessive consumption of drawing space. It is this signal of line 363 that is delivered through the output stage 61 of FIG. 2 to the I.F. sample gate 30 and which corrsponds identically to the signal of line 325 of FIG. 12 despite the fact that the signals do not appear the same because they were altered to emphasize various features of the signals of importance at the particular point of description.

Obviously many modifications and variations of the present invention are possible in the light of the above teachings. It is therefore to be understood that within the scope of the appended claims the invention may be practiced otherwise than as specifically described.

What is claimed is:

1. In an object locator system wherein periodic signals are analyzed to obtain location information, a signal recirculation loop having a finite recirculation time shorter than the period of the periodic signals by selected interval of time, means which may include part of said loop for periodically gating said loop to terminate the recirculation of selected signals and apply new periodic signals thereto, and a plurality of frequency selective filters connected to said loop for deriving output signals therefrom in a plurality of channels in dependency on frequency.

2. In an object locator system wherein periodic signals are analyzed to obtain location information, a signal recirculation loop having a finite recirculation time shorter than the period of the periodic signals by a selected interval of time, means which may include part of said loop for periodically gating said loop to terminate the recirculation of selected signals and apply new periodic signals thereto, a plurality of frequency selective filters connected to said loop for deriving output signals therefrom in a plurality of channels in dependency on frequency, and a peak selector connected to said filters to select the filter output having the maximum amplitude.

3. In an object locator system wherein periodic signals are analyzed to obtain location information, a signal recirculation loop having a finite recirculation time shorter than the period of the periodic signals by a selected interval of time, said loop containing a delay line, means which may include part of said loop for periodically gating said loop to terminate the recirculation of selected signals and apply new periodic signals thereto, a plurality of frequency selective filters connected to said loop for deriving output signals therefrom in a plurality of channels in dependency on frequency, and a peak selector connected to said filters to select the filter output having the maximum amplitude.

4. In an object locator system wherein periodic signals are analyzed to obtain location information, a signal recirculation loop having a finite recirculation time shorter than the period of the periodic signals by a selected interval of time, said loop containing a delay line, loop gating means for periodically blocking the recirculation within the loop of signals having selected time occurrence, sample gating means for applying new periodic signals to said loop during said loop recirculation blocking, a plurality of frequency selective filters connected to said loop for deriving output signals therefrom in a plurality of channels in dependency on frequency, and a peak selector connected to said filters to select the filter output having the maximum amplitude.

5. In an object locator system wherein periodic signals are analyzed to obtain location information, a signal recirculation loop having a finite recirculation time shorter than the period of the periodic signals by a selected interval of time, said loop containing a delay line, loop gating means for periodically blocking the recirculation within the loop of signals having selected time occurrence, sample gating means for applying new periodic signals to said loop during said loop recirculation blocking, a sampler carrier generator for impressing said periodic signals upon a carrier wave prior to application to the loop, said carrier wave having a frequency compatible with the bandwidth requirements of signals in the recirculation loop and the delay line signal handling characteristics, a plurality of frequency selective filters connected to said loop for deriving output signals therefrom in a plurality of channels in dependency on frequency, and a peak selector connected to said filters to select the filter output having the maximum amplitude.

6. In an object locator system wherein periodic signals are analyzed to obtain location information, a signal recirculation loop having a finite recirculation time shorter than the period of the periodic signals by a selected interval of time, said loop containing a delay line, loop gating means for periodically blocking the recirculation within the loop of signals having selected time occurrence, sample gating means for applying new periodic signals to said loop during said loop recirculation blocking, a sampler carrier generator for impressing said periodic signals upon a carrier wave prior to application to the loop, said carrier wave having a frequency compatible with the bandwidth requirements of signals in the recirculation loop and the delay line signal handling characteristics, said sampler carrier generator including a phase locked oscillator synchronized with the operation of said sample gating means for maintaining a uniform initial phase of the carrier wave at the start of each sample of new periodic signals applied to said loop, a plurality of frequency selective filters connected to said loop for deriving output signals therefrom in a plurality of channels in dependency on frequency, and a peak selector connected to said filters to select the filter output having the maximum amplitude.

7. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, and means which may include part of said loop for periodically gating said loop to terminate the recirculation of selected signals and apply sampled received signals thereto as new signals.

8. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, means which may include part of said loop for periodically gating said loop to terminate the recirculation of selected signals and apply sampled received signals thereto as new signals, and a plurality of frequency selective filters connected to said loop for deriving output signals therefrom in a plurality of channels in dependency on frequency.

9. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, means which may include part of said loop for periodically gating said loop to terminate the recirculation of selected signals and apply sampled received signals thereto as new signals, a plurality of frequency selective filters connected to said loop for deriving output signals therefrom in a plurality of channels in dependency on frequency, and a peak selector connected to said filters to select the filter output having the maximum amplitude.

10. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, said signal loop containing a quartz delay line, and means which may include part of said loop for periodically gating said loop to terminate the recirculation of selected signals and apply sampled received signals thereto as new signals.

11. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, said signal loop containing a quartz delay line, loop gating means for periodically blocking the recirculation within the loop of selected signals having selected time occurrence, sample gating means which may be cooperative with said means for sampling for applying new sampled received signals to said loop during said loop recirculation blocking, a plurality of frequency selective filters connected to said loop for deriving output signals therefrom in a plurality of channels in dependency on frequency, and a peak selector connected to said filters to select the filter output having the maximum amplitude.

12. In an object locator system wherein periodic signals are analyzed to obtain location information, a coherent pulse-echo radar system operative to provide recurrent received signals of selected duration in proportion to the duration of transmitted pulse, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, said signal loop containing a quartz delay line, loop gating means for periodically blocking the recirculation within the loop of selected signals having selected time occurrence, sample gating means which may be cooperative with said means for sampling for applying new sampled received signals to said loop during said loop recirculation blocking, a sampler carrier generator for impressing received signals upon a carrier wave prior to application to the loop, said carrier wave having a frequency compatible with the bandwidth requirements of signals in the recirculation loop and the delay line signal handling characteristics, a plurality of frequency selective filters connected to said loop for deriving output signals therefrom in a plurality of channels in dependency on frequency, and a peak selector connected to said filters to select the filter output having the maximum amplitude.

13. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, said signal loop containing a quartz delay line, loop gating means for periodically blocking the recirculation within the loop of selected signals having selected time occurrence, sample gating means which may be cooperative with said means for sampling for applying new sampled received signals to said loop during said loop recirculation blocking, a sampler carrier generator for impressing received signals upon a carrier wave prior to application to the loop, said carrier wave having a frequency compatible with the bandwidth requirements of signals in the recirculation loop and the delay line signal handling characteristics, said sampler carrier generator including a phase locked oscillator synchronized with the operation of said means for sampling for maintaining a uniform initial phase of the carrier wave at the start of each sample of new received signals applied to said loop, a plurality of frequency selective filters connected to said loop for deriving output signals therefrom in a plurality of channels in dependency on frequency, and a peak selector connected to said filters to select the filter output having the maximum amplitude.

14. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, said signal loop containing a quartz delay line, loop gating means for periodically blocking the recirculation within the loop of selected signals having selected time occurrence, sample gating means which may be cooperative with said means for sampling for applying new sampled received signals to said loop during said loop recirculation blocking, a sampler carrier generator for impressing received signals upon a carrier wave prior to application to the loop, said carrier wave having a frequency compatible with the bandwidth requirements of signals in the recirculation loop and the delay line signal handling characteristics, said sampler carrier generator including a phase locked oscillator synchronized with the operation of said means for sampling for maintaining a uniform initial phase of the carrier wave at the start of each sample of new received signals applied to said loop, a timing pulse recirculation loop having a recirculation time equal to the periodicity of the radar transmitter pulses for controlling the sampling of received signals, the signal loop gating and the phase locking of the sampler carrier generator, a plurality of frequency selective filters connected to said loop for deriving output signals therefrom in a plurality of channels in dependency on frequency, and a peak selector connected to said filters to select the filter output having the maximum amplitude.

15. In an object locator system wherein periodic signals are analyzed to obtain location information, a coherent pulse-echo radar system operative to provide recurrent received signals of selected duration in proportion to the duration of transmitted pulses, said received signals having a selected recurrence period as determined by the recurrence period of the transmitted signals, means for sampling recurrent received signals for a sampling period of substantially shorter duration than the transmitted pulses at intervals equal to the duration of the transmitter pulse, a signal recirculation loop having a finite recirculation time shorter than the periodicity of the transmitted pulses by the duration of one sampling period, said signal loop containing a quartz delay line, loop gating means for periodically blocking the recirculation within the loop of selected signals having selected time occurrence, sample gating means which may be cooperative with said means for sampling for applying new sampled received signals to said loop during said loop recirculation blocking, a sampler carrier generator for impressing received signals upon a carrier wave prior to application to the loop, said carrier wave having a frequency compatible with the bandwidth requirements of signals in the recirculation loop and the delay line signal handling characteristics, said sampler carrier generator including a phase locked oscillator synchronized with the operation of said means for sampling for maintaining a uniform initial phase of the carrier wave at the start of each sample of new received signals applied to said loop, a timing pulse recirculation loop having a recirculation time equal to the periodicity of the radar transmitter pulses for controlling the sampling of received signals, the signal loop gating and the phase locking of the sampler carrier generator, said timing loop containing a quartz delay line, a plurality of frequency selective filters connected to said loop for deriving output signals therefrom in a plurality of channels in dependency on frequency, and a peak selector connected to said filters to select the filter output having the maximum amplitude.

References Cited by the Examiner

UNITED STATES PATENTS

| | | | |
|---|---|---|---|
| 2,535,374 | 12/50 | Dicke | 343—7.7 |
| 3,046,545 | 7/62 | Westerfield | 343—5 |
| 3,064,251 | 11/62 | Diamond | 343—7.7 |

CHESTER L. JUSTUS, *Primary Examiner.*

KATHLEEN H. CLAFFY, *Examiner.*